(12) United States Patent
Fukumoto et al.

(10) Patent No.: US 6,508,657 B2
(45) Date of Patent: Jan. 21, 2003

(54) CONNECTOR

(75) Inventors: Yutaka Fukumoto, Shinagawa (JP);
Manabu Shimizu, Shinagawa (JP);
Takahiro Kondou, Shinagawa (JP);
Hideo Miyazawa, Shinagawa (JP);
Junichi Akama, Shinagawa (JP);
Moriyuki Ueno, Shinagawa (JP)

(73) Assignee: Fujitsu Takamisawa Component Ltd., Tokyo (JP)

( * ) Notice: Subject to any disclaimer, the term of this patent is extended or adjusted under 35 U.S.C. 154(b) by 0 days.

(21) Appl. No.: 09/899,130

(22) Filed: Jul. 6, 2001

(65) Prior Publication Data

US 2002/0031932 A1 Mar. 14, 2002

(30) Foreign Application Priority Data

Sep. 12, 2000 (JP) .......................... 2000-276402
Nov. 22, 2000 (JP) .......................... 2000-356046
Dec. 8, 2000 (JP) .......................... 2000-375180

(51) Int. Cl.$^7$ ............................................. H01R 11/22
(52) U.S. Cl. ........................ 439/267; 439/60; 439/260
(58) Field of Search ................................. 439/267, 260, 439/60; 235/492

(56) References Cited

U.S. PATENT DOCUMENTS 3,283,108 A * 11/1966 Collier ........................ 200/258
6,203,345 B1 * 3/2001 Roque et al. .................. 439/260
6,254,406 B1 * 7/2001 Chiu et al. .................... 439/260

FOREIGN PATENT DOCUMENTS

JP    10-083873    3/1998

* cited by examiner

Primary Examiner—Javaid Nasri

(57) ABSTRACT

A connector is electrically connected to a substrate in which a conductor pattern and electrodes at ends of the conductor pattern are provided on a surface of the substrate. The connector includes a plurality of contacts that are resiliently connectable to the electrodes of the substrate inserted in the connector. An insulator member contains the contacts arrayed therein. A slider unit is movably attached to the insulator member, the slider unit including a plurality of lugs that are connectable to respective edges of the contacts contained in the insulator member. The connector is configured such that the respective edges of the contacts are connected to the lugs of the slider unit before the slider unit is moved relative to the insulator member, so as to separate the contacts from the electrodes of the substrate, and the respective edges of the contacts are disconnected from the lugs after the slider unit is moved relative to the insulator member, so that the contacts are resiliently connected to the electrodes of the substrate.

3 Claims, 36 Drawing Sheets

FIG. 5
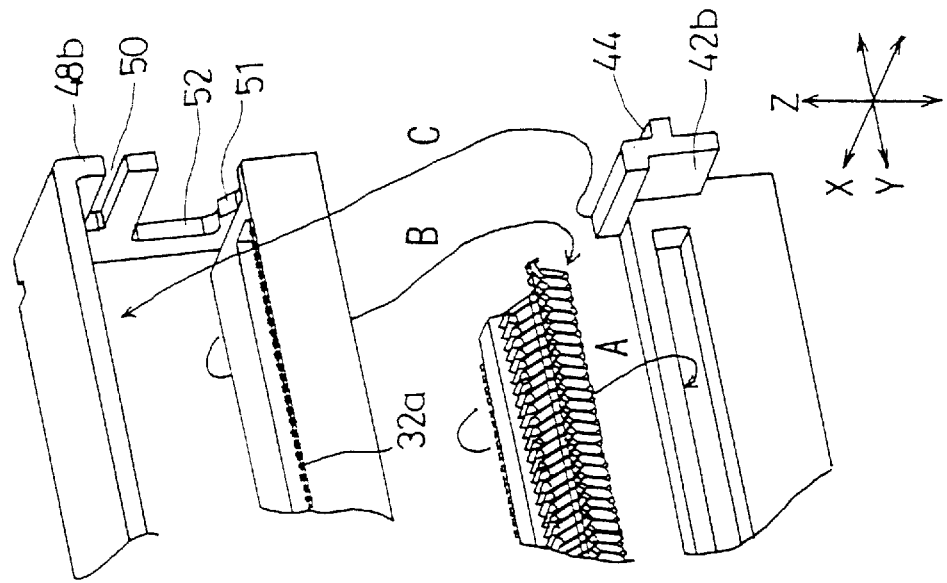
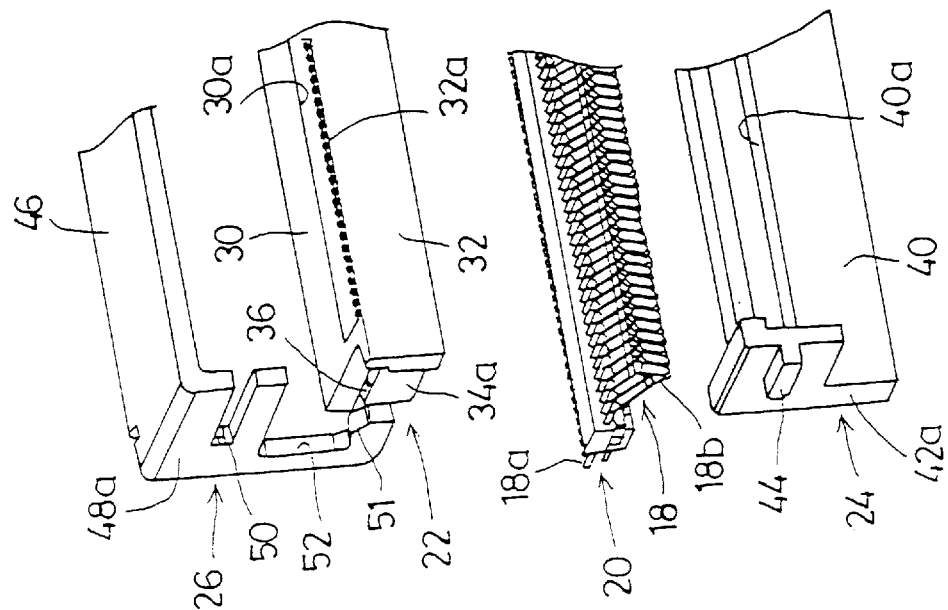

FIG. 9
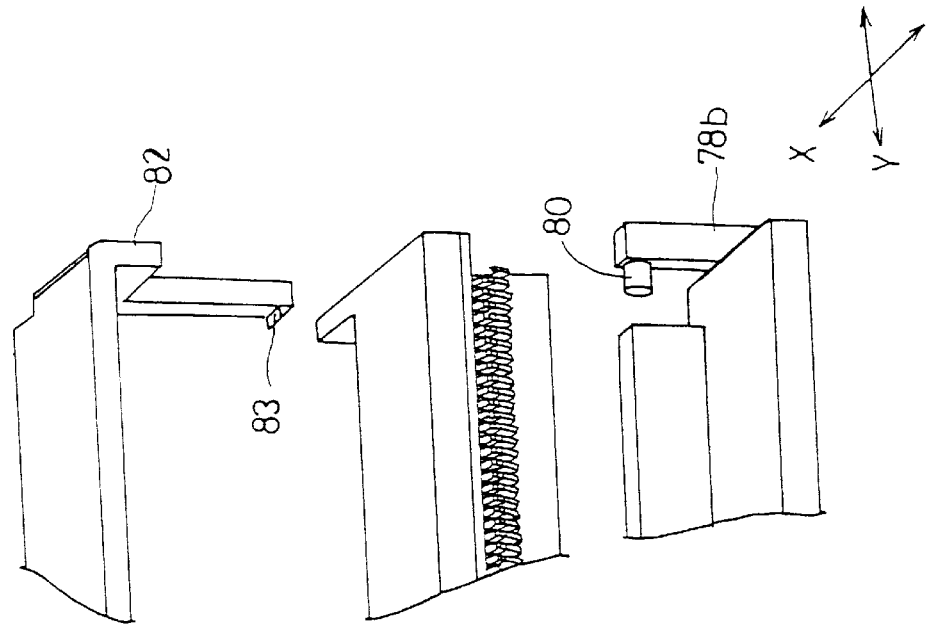
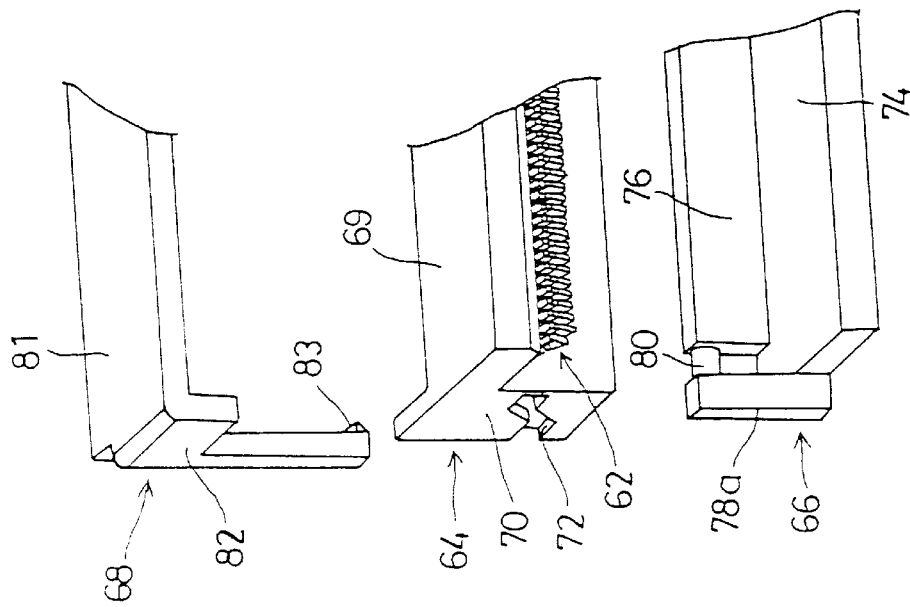

FIG. 25
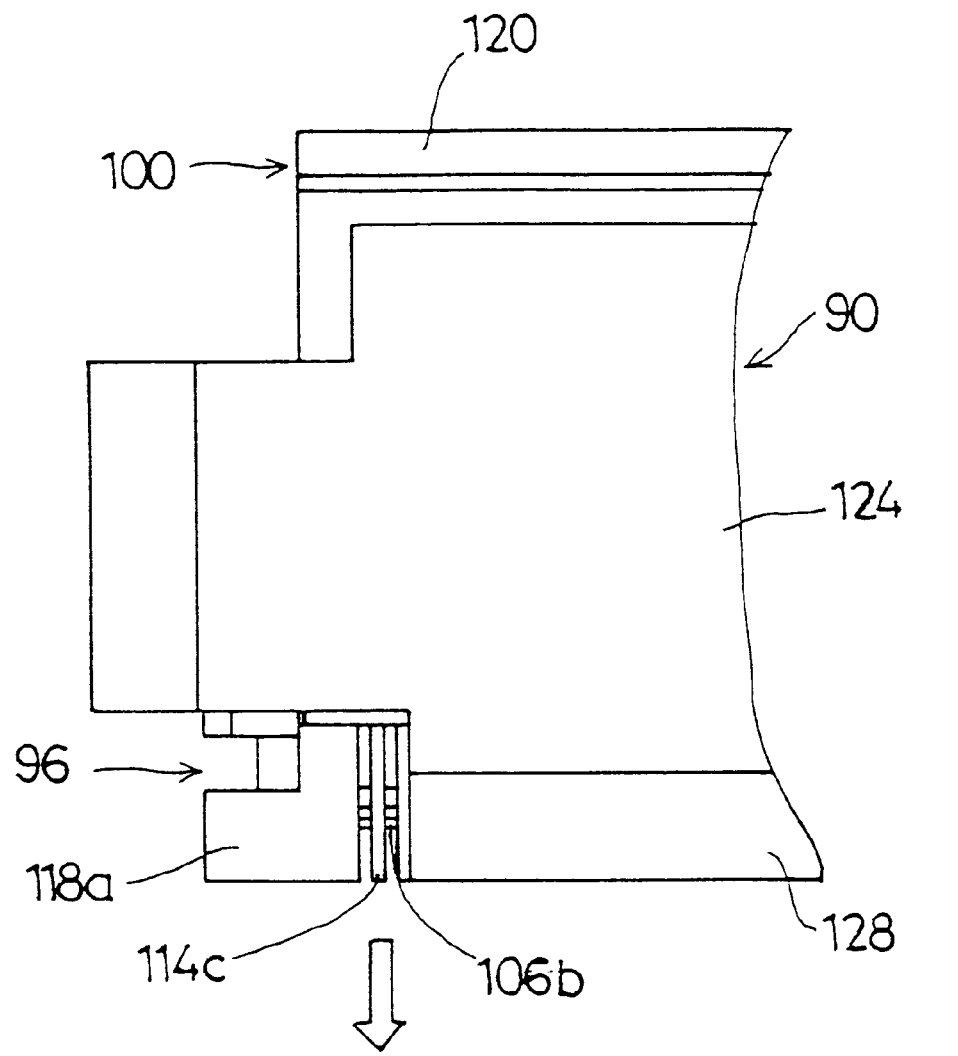
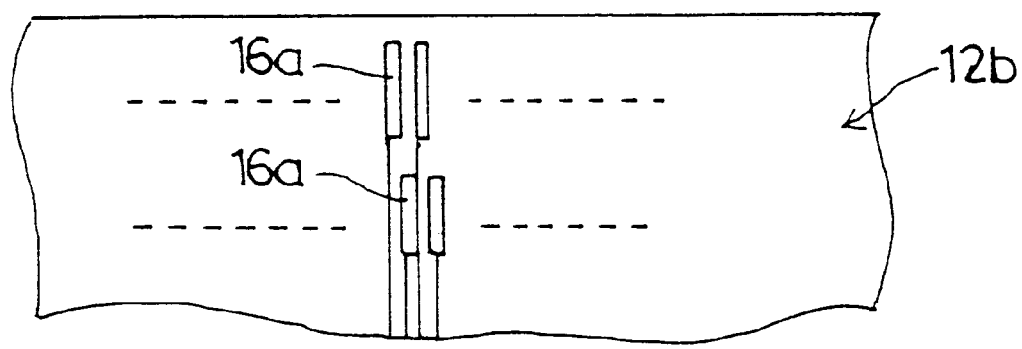

CONNECTOR

BACKGROUND OF THE INVENTION

1. Field of the Invention

The present invention relates to a connector which is electrically connected to a substrate in which a conductor pattern and electrodes at ends of the conductor pattern are provided on a surface of the substrate, the connector having contacts connected to the electrodes of the substrate. More specifically, the present invention relates to a connector that is appropriate for use with a glass substrate which forms a plasma display panel, the connector having contacts connected to electrodes of the glass substrate.

2. Description of the Related Art

Conventionally, a connector is electrically connected to a substrate wherein a conductor pattern and electrodes at ends of the conductor pattern are provided on a surface of the substrate, the connector having contacts connected to the electrodes of the substrate. For example, the substrate of this kind is used for card-type information recording media, liquid crystal display panels and plasma display panels.

A method of electrically connecting the connector to the substrate of the above type is that the connector contacts are mounted on the substrate electrodes by applying a pressing force, and the connections between the contacts and the electrodes are made by soldering. Another method is that a connector, having an insertion portion wherein contacts are internally provided, is inserted into an electrode portion of a substrate from the side of the substrate, and a frictional connection between the contacts and the substrate electrodes is made by the insertion operation.

In the former method, no substantial frictional connection between the contact and the electrode is required. This method may be called a zero insertion force method. The pressing and soldering steps of this method do not damage the substrate electrodes or the connector contacts. However, the individual connections between the contacts and the electrodes must be made by soldering. The soldering operations needed are time consuming, and the operability of this method is poor.

In the latter method, the frictional connection between the contacts and the electrodes can be easily performed by a one-touch operation. However, when the attaching of the connector to the substrate and the detaching of the connector from the substrate are repeated, the repeated operations in this method will cause the wearing or deformation of the substrate electrodes or the connector contacts, which is liable to damage the electrodes or the contacts.

As disclosed in Japanese Laid-Open Patent Application No.10-83873, an improved structure of connection between a glass substrate and a printed circuit board has been proposed in order to eliminate the above problems. FIG. 1 and. FIG. 2 show a configuration of the connection structure of the connector and the substrate disclosed in the above document.

As shown in FIG. 1 and FIG. 2, a liquid-crystal display panel 1 is formed by the glass substrate to be connected to the printed circuit board. In the liquid-crystal display panel 1, a liquid-crystal plate is interposed between two opposing glass substrates 3a and 3b, and each of the glass substrates 3a and 3b has transparent electrodes 2 provided therein. In the glass substrate 3b, the transparent electrodes 2 include respective extended parts which are exposed. The printed circuit board 4 includes a display driver circuit (LSI) and other circuits (not shown) provided thereon, and the display driver circuit controls the liquid-crystal display panel 1 connected to the printed circuit board 4.

The printed circuit board 4 includes a female connector 5 provided at a peripheral edge of the board. The transparent electrodes 2 of the glass substrate 3b serve as the male contacts. When the glass substrate 3b is inserted to the female connector 5, the electrodes 2 are connected to the connector 5 so that electric connection between the glass substrate 3b and the printed circuit board 4 is established.

As shown in FIG. 2, the female connector 5 is provided with a female contact 6, a housing 7, and a slider 8. The female contact 6 has a resilient characteristic. The housing 7 accommodates the female contact 6 inside the housing. The slider 8 is movably attached to the housing 7, and it is moved relative to the housing 7 when the glass substrate 3b is inserted to the female connector 5, so that the slider 8 serves to hold the transparent electrodes 2 of the glass substrate 3b with the female contact 6.

The slider 8 includes a holding portion 8a and a pair of mounting portions 8b. The holding portion 8a is extending along the width direction of the board 4. The mounting portions 8b are provided at ends of the holding portion 8a to attach the slider 8 to the housing 7. The holding portion 8a includes a flat holding surface 8c on the top thereof, and this holding surface 8c holds the glass substrate 3b with the female contact 6 when the glass substrate 3b is inserted to the female connector 5. The holding portion 8a includes a slanted surface 8d on the bottom thereof, and the holding portion 8a has a decreasing thickness along the direction of the insertion of the glass substrate 3b.

The housing 7 includes a pair of grooved portions 7a at positions corresponding to the mounting portions 8b of the slider 8. The mounting portions 8b are movably attached to the grooved portions 7a, and the slider 8 is movable relative to the housing 7 within a given range of allowance along the direction of the insertion of the glass substrate 3b.

In the connection structure shown in FIG. 1 and FIG. 2, when the glass substrate 3b is inserted to the female connector 5, the slider 8 is moved relative to the housing 7 in the direction of the insertion, so that the holding portion 8a is pushed inside the housing 7 and the glass substrate 3b is held between the female contact 6 and the holding surface 8c of the slider 8.

According to the above-described connection structure, the number of the connection points can be reduced to a value that is smaller than that of a conventional connection method using a flexible printed circuit board and an anisotropic conduction rubber connector. The reliability of connection of the connector and the substrate can be increased. Further, the number of the needed parts and the number of the needed assembly processes are decreased, and the manufacturing cost can be reduced.

However, in the above-described connection structure, it is difficult to maintain the contact condition of the female contact 6 and the electrodes 2 with adequate stability. When the connector 5 is connected to the glass substrate 3b, the slider 8 exerts pressure onto the female contact 6 via the electrodes 2, which will cause the deformation of the female contact 6. The pressure exerted by the slider 8 onto the female contact 6 reduces the spring force of the female contact 6, which will make the contact condition of the female contact 6 and the electrodes 2 inadequate or unstable.

SUMMARY OF THE INVENTION

It is an object of the present invention to provide an improved connector in which the above-described problems are eliminated.

Another object of the present invention is to provide a connector that is easily connected to the substrate by a one-touch operation, and maintains the contact condition of the connector contacts and the substrate electrodes with adequate stability.

Another object of the present invention is to provide a connector that requires no insertion force when it is connected to the substrate, and does not damage the substrate electrodes or the connector contacts.

The above-mentioned objects of the present invention are achieved by a connector which is electrically connected to a substrate in which a conductor pattern and electrodes at ends of the conductor pattern are provided on a surface of the substrate, the connector comprising: a plurality of contacts which are resiliently connectable to the electrodes of the substrate which is inserted in the connector; an insulator member which contains the contacts arrayed therein; and a slider unit which is movably attached to the insulator member, the slider unit including a plurality of lugs connectable to respective edges of the contacts contained in the insulator member, wherein the connector is configured such that the respective edges of the contacts are connected to the plurality of lugs of the slider unit before the slider unit is moved relative to the insulator member, so as to separate the contacts from the electrodes of the substrate, and the respective edges of the contacts are disconnected from the plurality of lugs after the slider unit is moved relative to the insulator member, so that the contacts are resiliently connected to the electrodes of the substrate.

The above-mentioned objects of the present invention are achieved by a connector which is electrically connected to a substrate in which a conductor pattern and electrodes at ends of the conductor pattern are provided on a surface of the substrate, the connector comprising: a plurality of contacts which are resiliently connectable to the electrodes of the substrate, wherein the contacts are arrayed in a staggered arrangement including first contacts and second contacts which are alternately arrayed; an insulator member which contains the plurality of contacts arrayed therein; and a slider unit which is movably attached to the insulator member, wherein the slider unit includes first-width portions and second-width portions arrayed in a staggered arrangement, and the first-width portions including lugs provided at lower positions of the first-width portions, the lugs being connectable to respective edges of the first contacts in the insulator member, and the second-width portions including connecting areas provided at upper positions of the second-width portions, the connecting areas being connectable to respective projections of the second contacts in the insulator member, wherein the connector is configured such that, before the slider unit is moved relative to the insulator member, the respective edges of the first contacts are connected to the lugs of the first-width portions and the respective projections of the second contacts are connected to the connecting areas of the second-width portions, so as to separate the plurality of contacts from the electrodes, and wherein the connector is configured such that, after the slider unit is moved relative to the insulator member, the respective edges of the first contacts are disconnected from the lugs of the first-width portions and the respective projections of the second contacts are disconnected from the connecting areas of the second-width portions, so that the plurality of contacts are resiliently connected to the electrodes.

The above-mentioned objects of the present invention are achieved by a connector which is electrically connected to a substrate in which a conductor pattern and electrodes at ends of the conductor pattern are provided on a surface of the substrate, the connector comprising: a plurality of contacts which are resiliently connectable to the electrodes of the substrate; an insulator member which contains the plurality of contacts arrayed therein, wherein the insulator member includes a cam groove at each of side surfaces of the insulator member, the cam grooves including low-level steps and high-level steps, and the insulator member is configured such that the substrate carrying the electrodes can be inserted to or removed from the insulator member; and a slider unit which is movably attached to the insulator member, the slider unit including projections connectable to intermediate portions of the contacts contained in the insulator member, the projections of the slider unit being fitted to the cam grooves of the insulator member, wherein the connector is configured such that, before the slider unit is moved relative to the insulator member, the projections of the slider unit are connected to the low-level steps of the cam grooves, so as to separate the contacts from the electrodes of the substrate inserted to the connector, and wherein the connector is configured such that, after the slider unit is moved relative to the insulator member, the projections of the slider unit are connected to the high-level steps of the cam grooves, so that the contacts are resiliently connected to the electrodes of the substrate by the connection between the projections and the intermediate portions of the contacts.

The above-mentioned objects of the present invention are achieved by a connector which is electrically connected to a substrate in which a conductor pattern and electrodes at ends of the conductor pattern are provided on a surface of the substrate, the connector comprising: a plurality of contacts which are resiliently connectable to the electrodes of the substrate; a contact unit which contains the contacts arrayed therein; and a housing which contains the contact unit in a manner that the contact unit is rotatable relative to the housing, the housing being configured such that the substrate carrying the electrodes can be inserted to or removed from the housing, wherein the connector is configured such that the contacts are separated from the electrodes before the substrate is inserted to the housing, and, after the substrate is inserted to the housing, the contacts are resiliently connected to the electrodes through the rotation of the contact unit relative to the housing.

In one preferred embodiment the present invention, the connector is configured such that the contacts are separated from the electrodes of the substrate before the slider unit is moved relative to the insulator member. No substantial frictional force is required when the substrate is inserted to or removed from the connector, which prevents the damaging of the substrate electrodes or the connector contacts. Further, the connector is configured such that the contacts are resiliently connected to the electrodes after the slider unit is moved relative to the insulator member. The connector can be easily connected to the substrate by a one-touch operation, and can maintain the contact condition of the contacts and the substrate electrodes with adequate stability because of the A spring force of the contacts. The deformation or damaging of the contacts over an extended period of time as in the conventional connector is remarkably reduced.

BRIEF DESCRIPTION OF THE DRAWINGS

Other objects, features and advantages of the present invention will become apparent from the following detailed description when read in conjunction with the accompanying drawings.

FIG. 5 is an exploded view of the connector of the present embodiment.

FIG. 9 is an exploded view of the connector of the present embodiment.

FIG. 25 is a diagram for explaining a method of position matching of the connector of the present embodiment.

DETAILED DESCRIPTION OF PREFERRED EMBODIMENTS

A description will now be provided of the preferred embodiments of the present invention with reference to the accompanying drawings.

In the following description, the connector of the present invention is embodied as a connector connected to a plasma display, and the preferred embodiments of the connector according to the present invention will be described with reference to the accompanying drawings.

Figure 1:
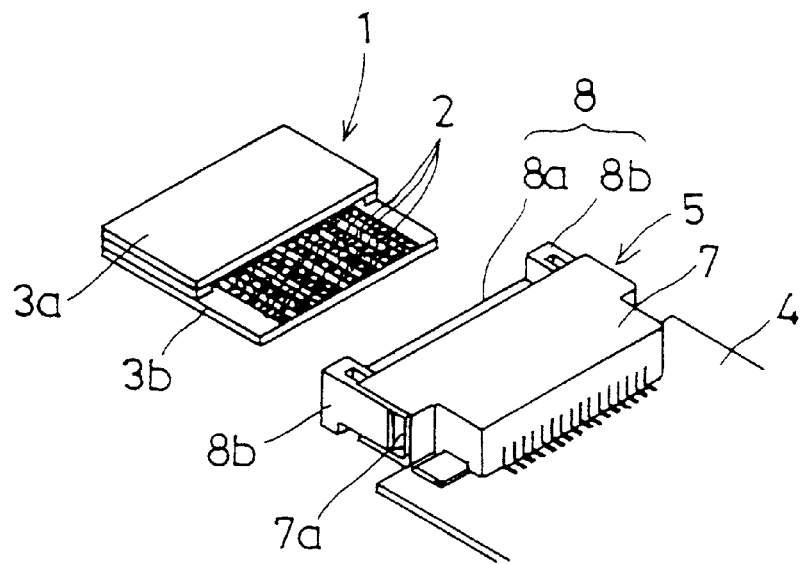
FIG. 1 is a perspective view of a conventional connection structure of a printed circuit board and a glass substrate.
Figure 2:
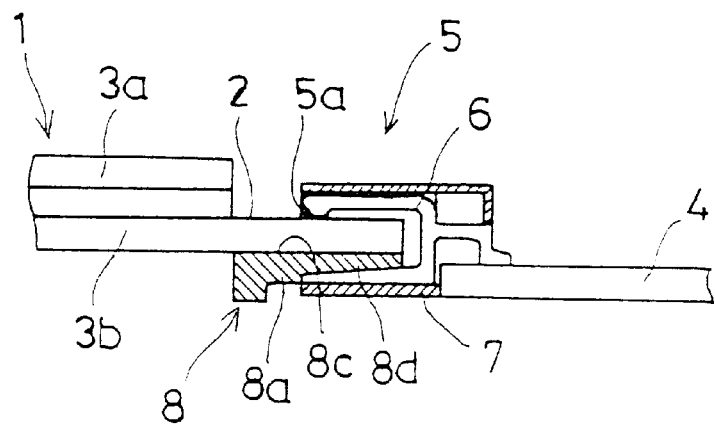
FIG. 2 is a cross-sectional view of the conventional connection structure.
Figure 3:
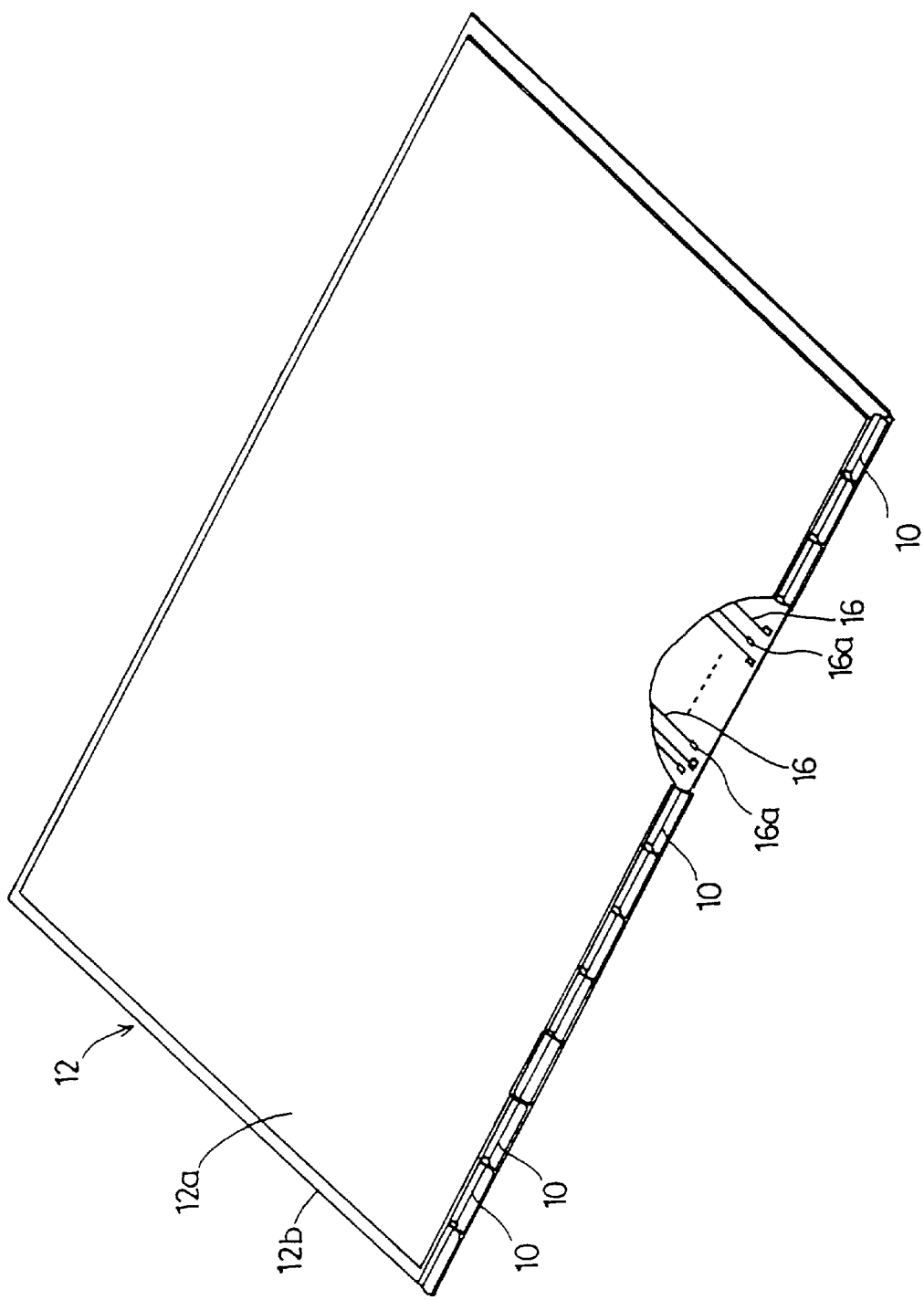
FIG. 3 is a perspective view of a plasma display to which one preferred embodiment of the connector of the invention is connected.

FIG. 3 shows a plasma display 12 to which one preferred embodiment of the connector of the invention is connected.

The connector 10 in the embodiment shown in FIG. 3 is a cable connector. In the present embodiment of FIG. 3, a plurality of the connectors 10 are arrayed on one side of the plasma display 12 and connected to the plasma display 12. The other ends of the respective connectors 10, which are opposite to the ends of the connectors 10 connected to the plasma display 12, are connected to a printed circuit board (not shown) on which a display driver circuit (LSI) for controlling the plasma display 12 is provided. Thus, electrical connection between the display driver circuit and the plasma display 12 is established by using the connectors 10.

The plasma display 12 includes two opposing glass substrates 12a and 12b, the glass substrate 12a provided on the front side of the plasma display 12, and the glass substrate 12b provided on the back side of the plasma display 12. In a case in which the plasma display 12 is a DC driven device, a plurality of pairs of X and Y display electrodes (not shown) are arrayed in a parallel formation on the inside surface of the glass substrate 12a. The back-side glass substrate 12b includes a dielectric layer and a protective layer provided thereon that confront the display electrodes of the front-side glass substrate 12a. A plurality of address electrodes 16 (a conductor pattern) are arrayed on the glass substrate 12b in a direction perpendicular to the direction of the display electrodes. A mixture gas including neon (Ne) and others is enclosed between the two glass substrates 12a and 12b. When a DC voltage is applied to the X and Y display electrodes of one of the plurality of pairs, a plasma discharge is created at the intersection point of the X and Y display electrodes. In this manner, a plasma display indication is displayed by the plasma display 12 with the emission of light due to the plasma discharge.

In the plasma display 12 of FIG. 3, address lines 16 and connection electrodes 16a at ends of the address lines 16 are provided on the glass substrate 12b. The address lines 16 are extending in the width direction of the plasma display 12. The connection electrodes 16a are formed at the ends of the address lines 16 in a staggered arrangement in which two adjacent ones of the electrodes 16a are placed in two rows. The connectors 10 of the present embodiment are connected to the back-side glass substrate 12b through the electrodes 16a.

Alternatively, the ends of the address lines 16 may be connected directly to the connectors 10 without forming the connection electrodes 16a.

Figure 4:
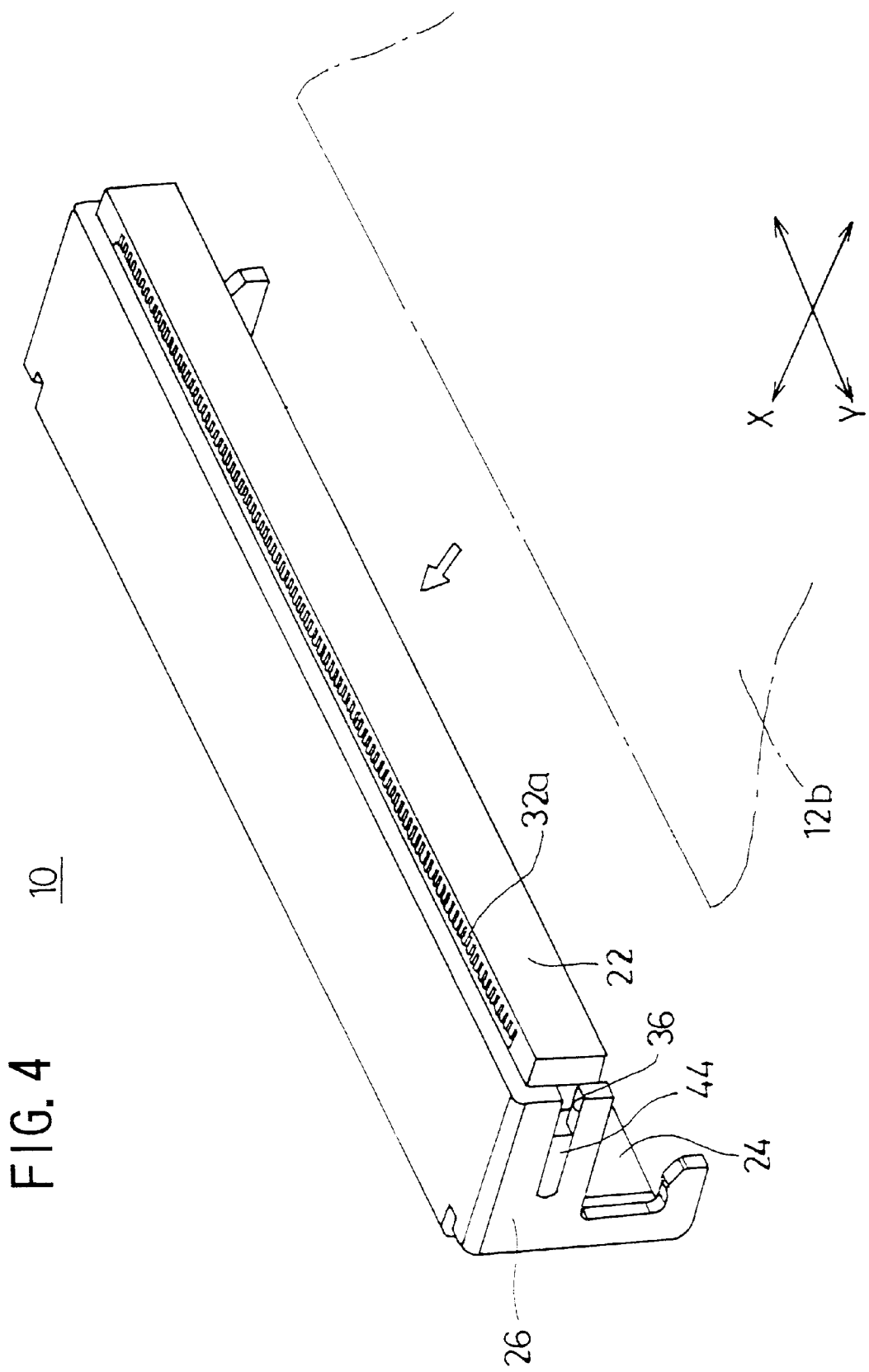
FIG. 4 is a perspective view of a first preferred embodiment of the connector of the present invention.
Figure 6:
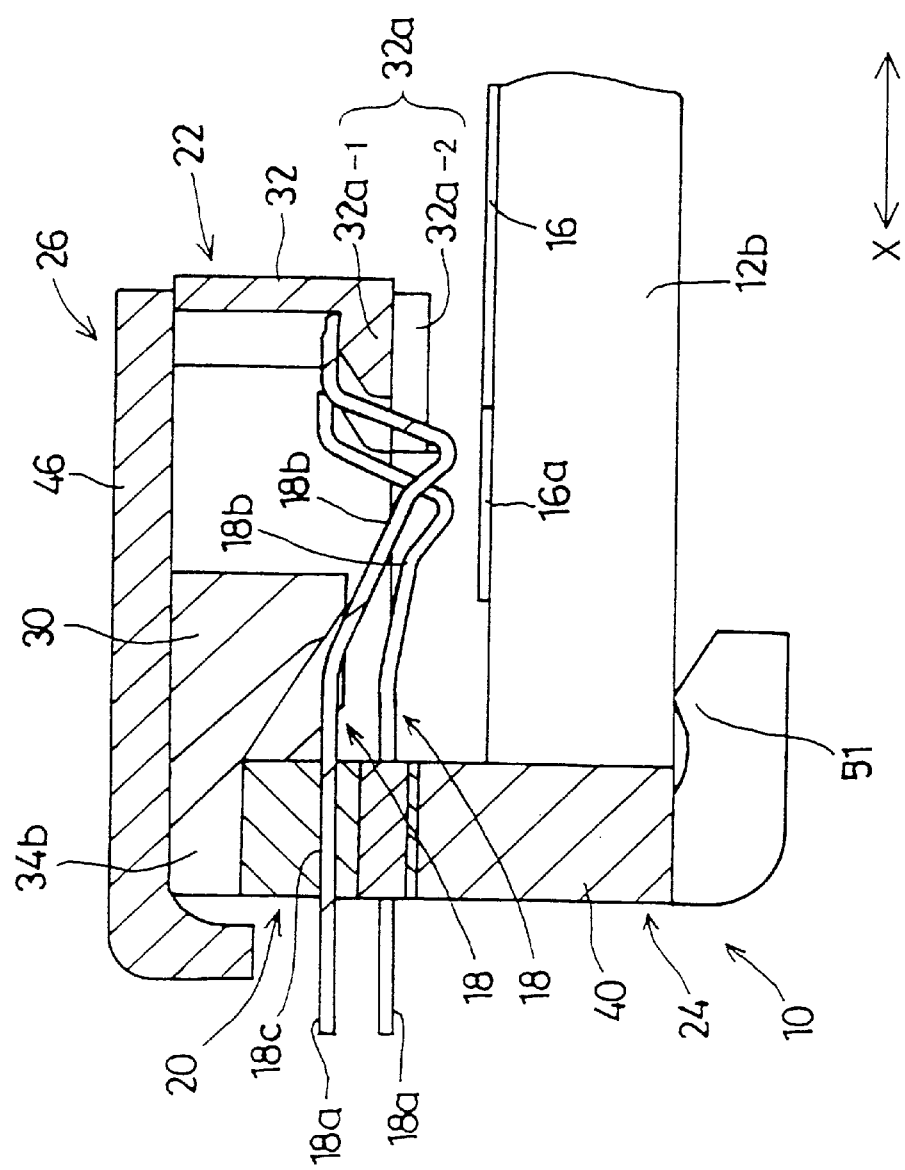
FIG. 6 is a cross-sectional view of the connector of the present embodiment and the glass substrate before a slider unit is moved relative to a contact mounting unit.
Figure 7:
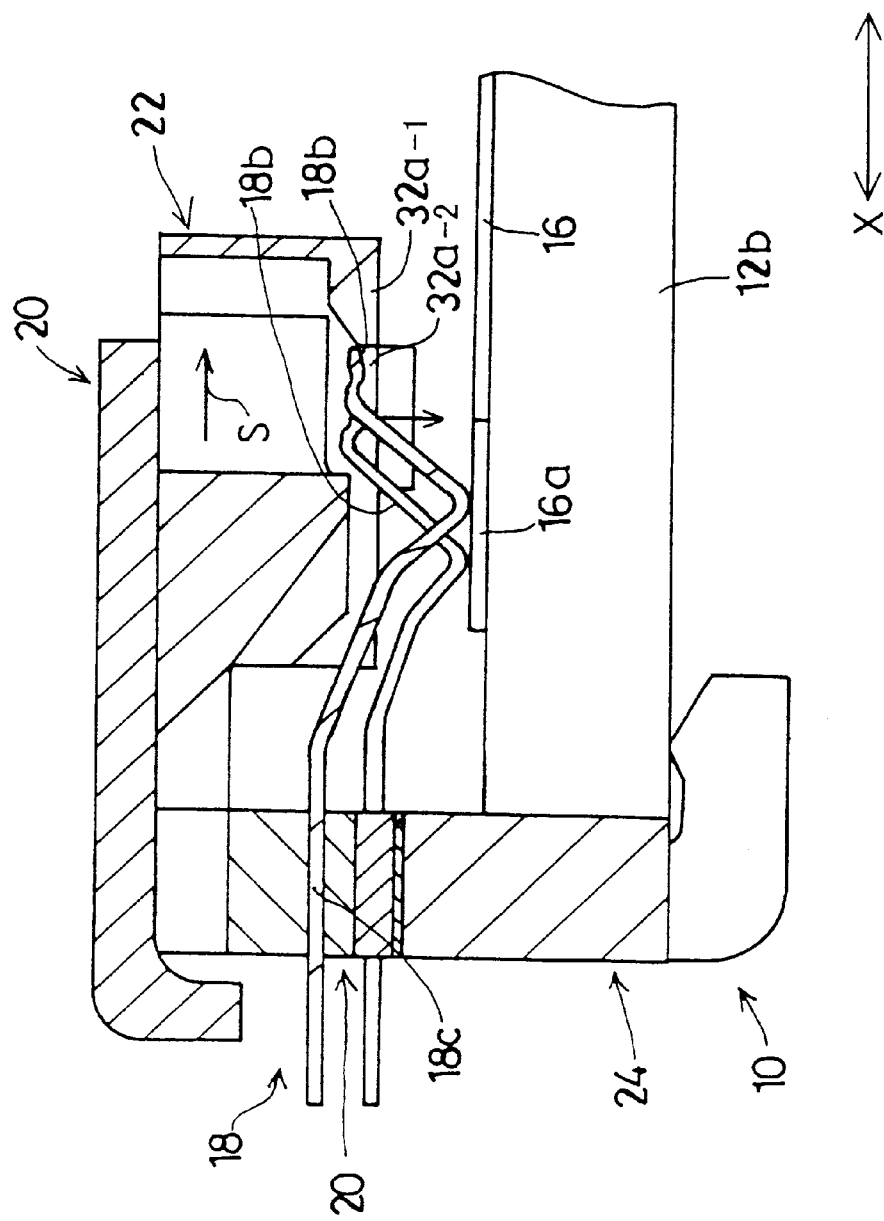
FIG. 7 is a cross-sectional view of the connector of the present embodiment and the glass substrate after the slider unit is moved relative to the contact mounting unit.

FIG. 4 shows a connector 10 as a first preferred embodiment of the present invention. FIG. 5 is an exploded view of the connector 10 of the present embodiment. FIG. 6 is a cross-sectional view of the connector 10 of the present embodiment and the glass substrate 12b before a slider unit is moved relative to a contact mounting unit. FIG. 7 is a cross-sectional view of the connector 10 of the present embodiment and the glass substrate 12b after the slider unit is moved relative to th e contact mounting unit.

As shown, the connector 10 of the present embodiment has a generally L-shaped cross-section that is taken along the line perpendicular to the longitudinal direction (indicated by the arrow Y in FIG. 4). The connector 10 generally includes a contact mounting unit 20, a slider unit 22, an insulation unit 24, and a shell unit 26. The contact mounting unit 20 contains a plurality of contacts 18 that are arranged in the contact mounting unit 20. The contact mounting unit 20, the insulation unit 24 and the shell unit 26 form an insulation member that accommodates the contacts 18.

When the connector 10 of the present embodiment is attached to the plasma display 12 shown in FIG. 3, the glass substrate 12b of the plasma display 12 is inserted to the connector 10 in the insertion direction indicated by the hollow arrow in FIG. 4.

As shown in FIG. 6 and FIG. 7, each of the contacts 18 is configured so that it includes a straight-line first contact portion 18a, a V-shaped second contact portion 18b and a connecting portion 18c. The connecting portion 18c connects the first contact portion 18a and the second contact portion 18b. The contacts 18 are respectively prepared as one of two types: the first type having a short second contact portion 18b the length of which is relatively small, and the second type having a long second contact portion 18b the length of which is relatively large.

As described earlier, by using a wiring cable (not shown), the respective first contact portions 18a of the contacts 18 are connected to a printed circuit board (not shown) on which a display driver circuit (LSI) for controlling the plasma display 12 is provided. The electrical connection between the display driver circuit and the plasma display 12 is established by using the connectors 10.

As described above, the contact mounting unit 20 contains the plurality of contacts 18 arrayed therein. The contacts 18 are arrayed in a staggered arrangement in which one of the first type and the second type is alternately used along the longitudinal line of the contact mounting unit 20. Namely, when one of the contacts 18 is provided with the first type having the shortened second contact portion 18b, the next one of the contacts 18 adjacent to that contact is provided by the second type having the elongated second contact portion 18b.

When forming the contact mounting unit 20 that contains the plurality of contacts 18 arrayed in a staggered arrangement, the set of the first-type contacts 18 and the set of the second-type contacts 18 are embedded in two blocks of a suitable insulation material, and, the contact mounting unit 20 is produced by performing an insert molding process separately for the two blocks.

The slider unit 22 is formed by using an insulating material. The slider unit 22 has a generally L-shaped cross-section that is taken along the line perpendicular to the longitudinal direction (indicated by the arrow Y in FIG. 5) of the slider unit 22. The slider unit 22 includes an upper wall 30, a front wall 32, a side wall 34a and a side wall 34b. The side walls 34a and 34b are provided at the ends of the slider unit 22 in the longitudinal direction. The upper wall 30 includes an opening 30a formed therein, and the opening 30a is extending in the longitudinal direction Y. The front wall 32 includes a plurality of lugs 32a that are arrayed in the longitudinal direction Y. Each of the lugs 32a projects from the front wall 32 in the direction X and has an inclined inward edge. As shown in FIG. 6 and FIG. 7, the lugs 32a of the front wall 32 are prepared as one of two types: a short lug 32a-1 and a long lug 32a-2. The lugs 32a are arrayed in a staggered arrangement in which one of the short-lug type and the long-lug type is alternately used along the longitudinal line of the front wall 32. Namely, for two adjacent ones of the lugs 32a of the front wall 32, the short lug 32a-1 and the long lug 32a-2 are alternately provided. The arrangement of the short and long lugs 32a-1 and 32a-2 of the front wall 32 corresponds to the arrangement of the short and long second contact portions 18b of the contacts 18. Each of the side walls 34a and 34b includes a cut-out portion 36 at an upper position of the outside surface thereof. The cut-out portion 36 is extending in the direction X and open to the rear-side end of the cut-out portion only.

The insulation unit 24 includes a rear wall 40, a side wall 42a and a side wall 42b. The side walls 42a and 42b are provided at the ends of the insulation unit 24 in the longitudinal direction. The rear wall 40 includes an opening 40a formed therein, and the opening 40a is extending in the longitudinal direction Y. Each of the side walls 42a and 42b includes a projection 44, and the projection 44 is extending on each side wall in the direction X.

The shell unit 26 is formed by using an insulating material. The shell unit 26 has a generally L-shaped cross-section that is taken along the line perpendicular to the longitudinal direction (indicated by the arrow Y in FIG. 5) of the shell unit 26. The shell unit 26 includes an upper wall 46, a leg portion 48a and a leg portion 48b. The leg portions 48a and 48b are provided at the ends of the upper wall 46 in the longitudinal direction. Each of the leg portions 48a and 48b includes an upper cut-out portion 50 and a lower cut-out portion 52 which are extending in the direction X and open only to the front side end of the cut-out portion. The width of the upper cut-out portion 50 in the direction Z is smaller than the width of the lower cut-out portion 52 in the direction Z. Each of the leg portions 48a and 48b includes a projection 51 at a lower position thereof, and the projection 51 projects toward the cut-out portion 52.

When assembling the above-described components into the connector 10 of the present embodiment, the following assembly processes are performed. First, the contact mounting unit 20 is inserted into the opening 40a of the insulation unit 24, and the contact mounting unit 20 is attached to the insulation unit 24 (indicated by the arrow A in FIG. 5). Second, the lugs 32a of the slider unit 22 are placed onto the second contact portions 18b of the contacts 18 so that the top surface of the contact mounting unit 20 is covered with the slider unit 22, while the projections 44 of the insulation unit 24 are inserted into the cut-out portions 36 of the slider unit 22 so that the slider unit 22 is attached to both the contact mounting unit 20 and the insulation unit 24 (indicated by the arrow B in FIG. 5). Finally, the projections 44 of the insulation unit 24 are inserted into the cut-out portions 50 of the shell unit 26 so that the insulation unit 24 wherein the slider unit 22 and the contact mounting unit 20 are connected together, is attached to the shell unit 26 (indicated by the arrow C in FIG. 5).

By carrying out the above assembly processes, the components are assembled together so that the connector 10 of the present embodiment is provided as the final product.

As described above, the connector 10 of the present embodiment is configured such that the slider unit 22 is movable in the direction X when the connector 10 is connected to the glass substrate 12b.

In the present embodiment, when connecting the connector 10 to the glass substrate 12b, the following operations are performed. First, the glass substrate 12b of the plasma display is inserted to the connector 10 in the insertion direction X as indicated in FIG. 4. The glass substrate 12b is fitted to the cut-out portions 52 of the shell unit 26, and the shell unit 26 firmly holds the inserted glass substrate 12b while the projections 51 exert pressure onto the glass substrate 12b at the ends of the shell unit .26. Second, a jig (not shown) is connected to the side walls 34a and 34b of the slider unit 22, and, by using the jig, the slider unit 22 is moved relative to the contact mounting unit 20 so as to disconnect the second contact portions 18b from the lugs 32a of the slider unit 32. Then, the contacts 18 are resiliently connected to the electrodes 16a of the glass substrate 12b so that electrical connection between the connector 10 (the contacts 18) and the glass substrate 12 (the electrodes 16a) is established.

The cut-out portions 52 of the shell unit 26 serve to provide an allowance of the position in the longitudinal direction Y for the glass substrate 12b being inserted to the connector 10, wherein the glass substrate 12b has a length much larger than the length of the connector 10.

A description will now be given of the connection structure of the connector 10 of the present embodiment and the glass substrate 12b with reference to FIG. 6 and FIG. 7.

As described earlier, FIG. 6 shows the connection structure of the connector 10 of the present embodiment and the glass substrate 12b before the slider unit 22 is moved relative to the contact mounting unit 20. FIG. 7 shows the connection structure of the connector 10 of the present embodiment and the glass substrate 12b after the slider unit 22 is moved relative to the contact mounting unit 20. For the sake of convenience of illustration, the cross-section of the glass plate 12b is indicated as the hollow region, and the hatching lines of the glass plate 12b are omitted.

As shown in FIG. 6, after the glass substrate 12b is inserted to the connector 10 but before the slider unit 22 is moved relative to the contact mounting unit 20, the leading edge of the glass substrate 12b is brought into contact with the rear wall 40 of the insulation unit 24. As described above, the contacts 18 are integrally formed with the contact mounting unit 20 through the insert molding process, and the leading edges of the second contact portions 18b at this time are placed onto on the lugs 32b of the slider unit 22. Hence, the contacts 18 of the connector 10 are separated from the electrodes 16a of the glass substrate 12b.

When the connector 10 is set in the condition shown in FIG. 6, the jig is connected to the side walls 34a and 34b of the slider unit 22, and, by using the jig, the slider unit 22 is moved relative to the contact mounting unit 20 in the direction indicated by the arrow S in FIG. 7. The condition of the connector 10 is changed to the condition shown in FIG. 7.

As shown in FIG. 7, after the slider unit 22 is moved relative to the contact mounting unit 20, the second contact portions 18b of the contacts 18 are separated from the lugs 32a of the slider unit 32. Then, the contacts 18, the connecting portions 18c of which are supported by the contact mounting unit 20, are resiliently connected to the electrodes 16a of the glass substrate 12b. The contacts 18 at this time are firmly and stably connected to the electrodes 16a owing to the spring force of the contacts 18. Consequently, the electrical connection between the connector 10 (the contacts 18) and the glass substrate 12 (the electrodes 16a) is established.

In an alternative embodiment, the leg portions 48a and 48b of the shell unit 26 may be provided with holes, and the side walls 34a and 34b of the slider unit 22 may be provided with projections. In such alternative embodiment, the connector 10 is configured such that the projections of the slider unit 22 are fitted into the holes of the shell unit 26. The connector 10 in such alternative embodiment provides a more stable connection structure of the connector 10 and the glass substrate 12b, and even when an external force acts on the connector 10 or the glass substrate 12b, the connection of the projections and the holes will prevent the disconnection of the connector 10 from the glass substrate 12b.

In the present embodiment, when disconnecting the connector 10 from the glass substrate 12b in the condition shown in FIG. 7, the slider unit 22 is moved, relative to the contact mounting unit 20, in the opposite direction to the initial position. Namely, the jig is again connected to the side walls 34a and 34b of the slider unit 22, and, by using the jig, the slider unit 22 is moved in the opposite direction to the initial position (shown in FIG. 6) so as to place the second contact portions 18b onto the lugs 32a of the slider unit 32. When the connector 10 is set in the condition shown in FIG. 6, the connector 10 can be easily removed from the glass substrate 12b. No substantial frictional force is exerted on the contacts 18 or the electrodes 16a when disconnecting the connector 10 from the glass substrate 12b.

In the above-described embodiment, the connector 10 is configured such that the contacts 18 are separated from the electrodes 16a of the substrate 12b before the slider unit 22 is moved relative to the contact mounting unit 20. No substantial frictional force is required when the glass substrate 12b is inserted to or removed from the connector 10, which prevents the damaging of the substrate electrodes 16a or the connector contacts 18. Further, the connector 10 is configured such that the contacts 18 are resiliently connected to the electrodes 16a after the slider unit 22 is moved relative to the contact mounting unit 20. The connector 10 can be easily connected to the substrate 12b by a one-touch operation, and can maintain the contact condition of the contacts 18 and the substrate electrodes 16a with adequate stability because of the spring force of the contacts 18. The deformation or damaging of the contacts 18 over an extended period of time as in the conventional connector is remarkably reduced.

Further, in the connector 10 of the above-described embodiment, the contacts 18 are arrayed in a staggered arrangement in which one of the first type and the second type is alternately used along the longitudinal line of the contact mounting unit 20. The connector 10 of the present embodiment is appropriate for use with the glass substrates of the plasma display 12 wherein the address lines 16 and the electrodes 16a are integrated with a high density and with a fine pitch.

Figure 8:
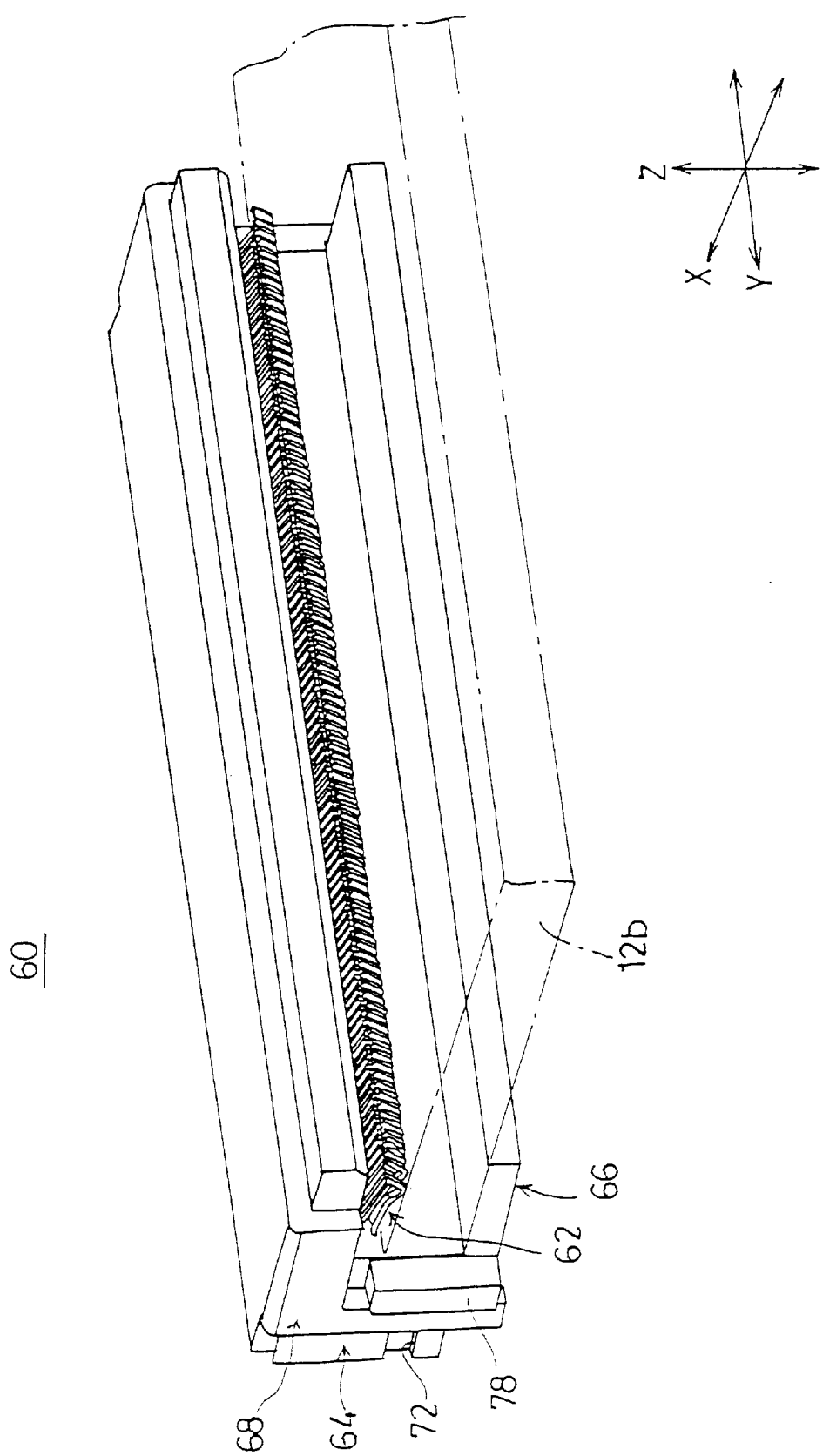
FIG. 8 is a perspective view of a second preferred embodiment of the connector of the present invention.

Next, FIG. 8 shows a connector 60 as a second preferred embodiment of the present invention.

Similar to the connector 10 of the first preferred embodiment, the connector 60 of the present embodiment is a connector connected to the glass substrate 12b of the plasma display 12.

Figure 10:
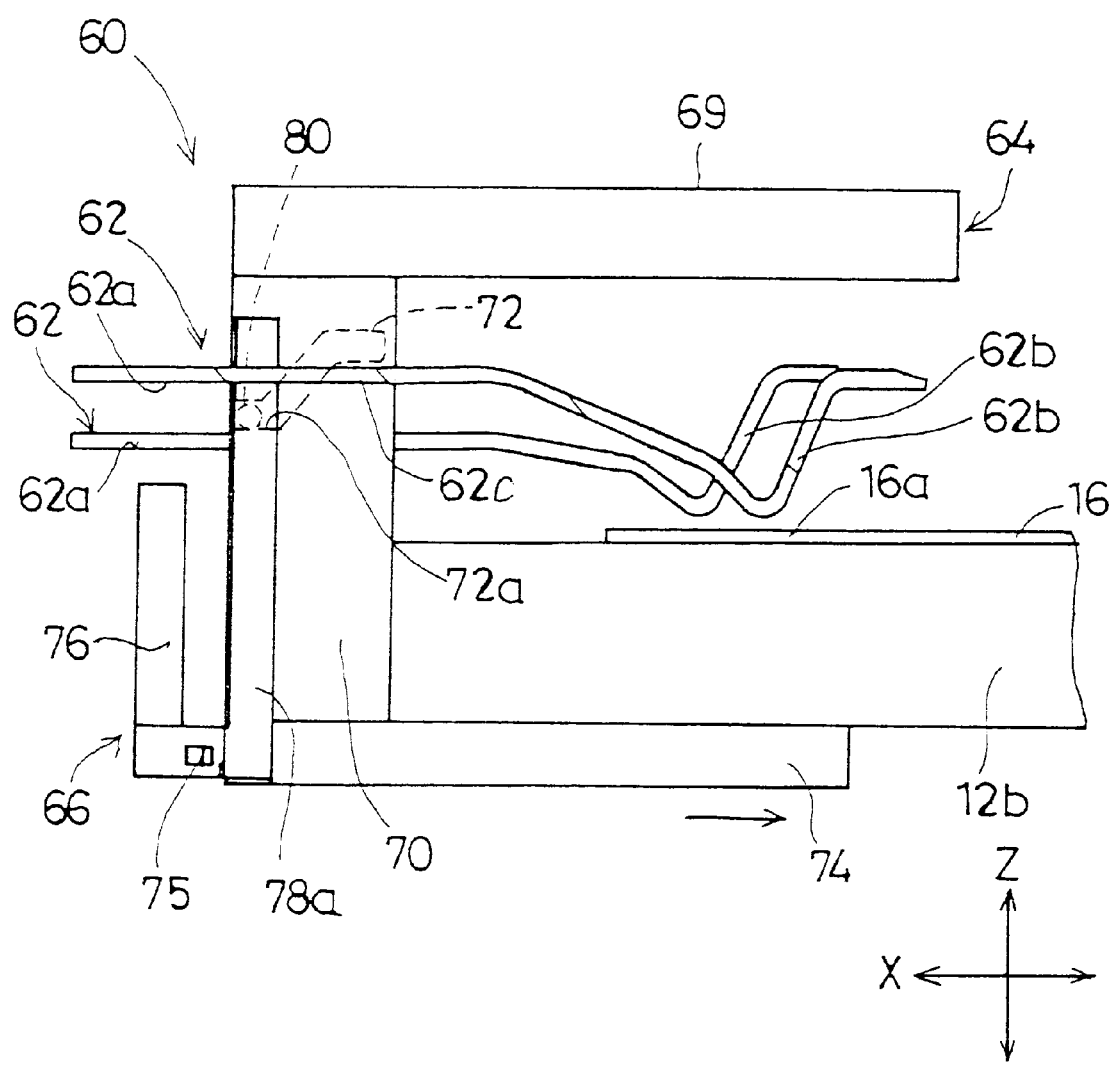
FIG. 10 is a cross-sectional view of the connector of the present embodiment and the glass substrate before connection of the connector and the glass substrate is complete.
Figure 11:
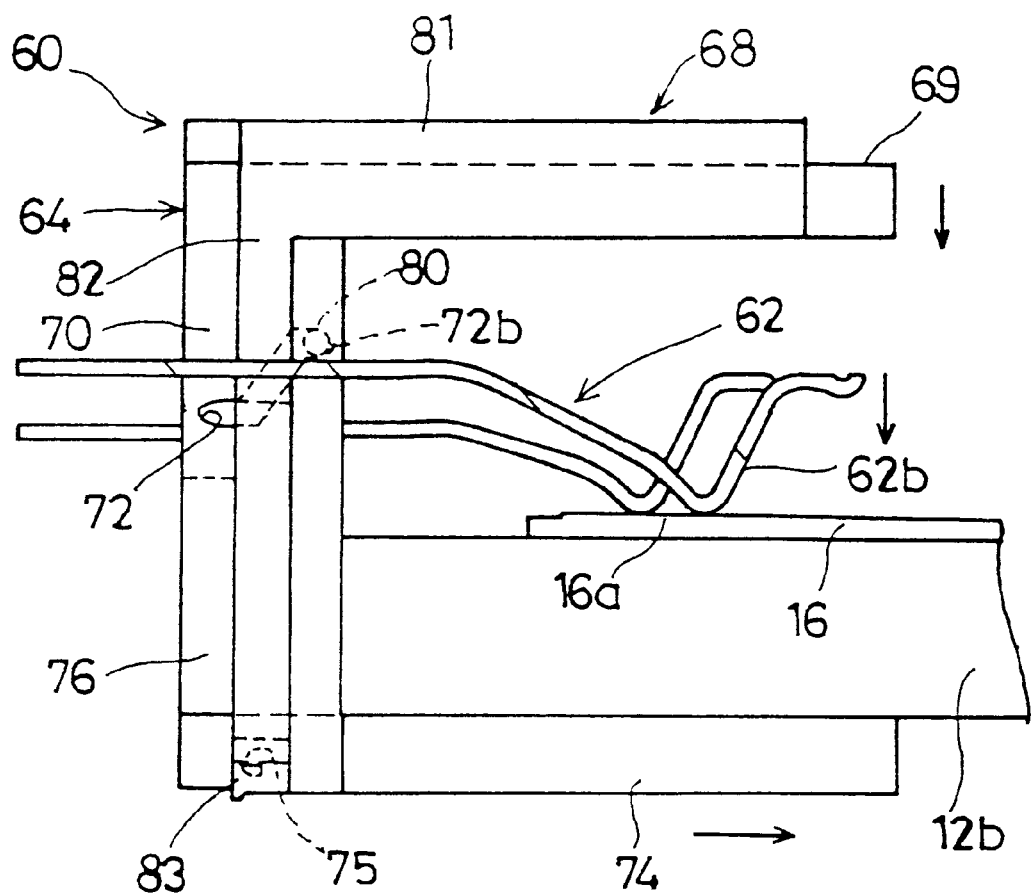
FIG. 11 is a cross-sectional view of the connector of the present embodiment and the glass substrate after the connection of the connector and the glass substrate is complete.

FIG. 9 is an exploded view of the connector 60 of the present embodiment. FIG. 10 is a cross-sectional view of the connector 60 of the present embodiment and the glass substrate before connection of the connector and the glass substrate is complete. FIG. 11 is a cross-sectional view of the connector 60 of the present embodiment and the glass substrate after the connection of the connector 60 and the glass substrate is complete.

As shown, the connector 60 of the present embodiment has a generally C-shaped cross-section that is taken along the line perpendicular to the longitudinal direction indicated by the arrow Y in FIG. 8. The connector 60 generally includes a contact mounting unit 64, an insulation unit 66, and a fixing unit 68. The contact mounting unit 64 contains a plurality of contacts 62 that are arranged in the contact mounting unit 64. In the connector 60 shown in FIG. 8, the glass substrate 12b of the plasma display 12 is inserted to the connector 60.

In the connector 60 of the present embodiment, the contact mounting unit 64 serves as the insulator member of the first preferred embodiment of FIG. 4, and the insulation unit 66 serves as the slider unit of the first preferred embodiment of FIG. 4.

As shown in FIG. 10, each of the contacts 62 is configured so that it includes a straight-line first contact portion 62a, a V-shaped second contact portion 62b and a connecting portion 62c. The connecting portion 62c connects the first contact portion 62a and the second contact portion 62b. The contacts 62 are respectively prepared as one of two types: the first type having a short second contact portion 62b the length of which is relatively small, and the second type having a long second contact portion 62b the length of which is relatively large.

By using a wiring cable (not shown), the respective first contact portions 62a of the contacts 62 are connected to a printed circuit board (not shown) on which a display driver circuit (LSI) for controlling the plasma display 12 is provided. The electrical connection between the display driver circuit and the plasma display 12 is established by using a plurality of the connectors 60.

The contact mounting unit 64 is formed by using an insulating material, and has a generally L-shaped cross-section that is taken along the line perpendicular to the longitudinal direction Y of the contact mounting unit 64. The contact mounting unit 64 includes an upper wall 69 and a vertical wall 70. The vertical wall 70 has a relatively large thickness in the direction X. The vertical wall 70 has a longitudinally extending surface in which the contacts 62 are arranged. The contact mounting unit 64 contains the contacts 62 arrayed therein. Similar to the contacts 18, the contacts 62 are arrayed in a staggered arrangement in which one of the first type and the second type is alternately used along the longitudinal line of the contact mounting unit 64.

Further, in the contact mounting unit 64, the vertical wall 70 has side surfaces at the ends of the longitudinally extending surface, and each of the side surfaces includes a cam groove 72. The cam groove 72 extends in the X direction and includes a low-level step 72a (indicated in FIG. 10), a high-level step 72b (indicated in FIG. 11), and a slanted portion continuously interconnecting the low-level step 72a and the high-level step 72b.

The insulation unit 66 is formed by using an insulating material. The insulation unit 66 has a generally L-shaped cross-section that is taken along the line perpendicular to the longitudinal direction Y of the insulation unit 66. The insulation unit 66 includes a lower wall 74, a rear wall 76, a side post 78a and a side post 78b. The rear wall 76 is provided at the rear end of the lower wall 76 in the direction X, and extends in the longitudinal direction Y. The side posts 78a and 78b are provided at the ends of the insulation unit 66 in the longitudinal direction Y. Each of the side posts 78a and 78b includes a cylindrical projection 80 at an upper position of the side post, and these projections 80 are inwardly extending in the direction Y.

The fixing unit 68 is formed by using a metallic material. The fixing unit 68 has a generally L-shaped cross-section that is taken along the line perpendicular to the longitudinal direction Y. The fixing unit 68 includes an upper wall 81 and a pair of leg portions 82. The leg portions 82 are provided at the ends of the upper wall 81 in the longitudinal direction Y and extending from the upper wall 81 in the downward vertical direction. Each of the leg portions 82 includes an inward lug 83 at the bottom of the leg portion 82, and these lugs 83 extend in the Y direction.

When assembling the above-described components into the connector 60 of the present embodiment, the following assembly processes are performed. First, the projections 80 of the insulation unit 66 are fitted into the cam grooves 72 of the contact mounting unit 64, including the contacts 62 arrayed therein, and the insulation unit 66 is connected to the contact mounting unit 64. The projections 80 of the insulation unit 66 at this time are fitted to the low-level steps 72a of the cam grooves 72, and the contacts 62 of the contact mounting unit 64 are not connected to the projections 80. Before the connection of the connector 60 and the glass substrate 12b is complete, the contacts 62 are placed in this condition as shown in FIG. 10.

Next, a jig (not shown) is connected to, for example, the contact mounting unit 64, and, by using the jig, the contact mounting unit 64 and the insulation unit 66 are moved relative to each other in the direction X and the direction Z, and the projections 80 are fitted to the high-level steps 72b of the cam grooves 72 through the connection of the projections 80 and the cam grooves 72, and the projections 80 are connected to press the contacts 62 downwardly. In the present embodiment, the connector 60 of the present embodiment is configured such that the insulation unit 66 is movable relative to the contact mounting unit 64 in both the direction X and the direction Z when the connector 60 is connected to the glass substrate 12b of the plasma display 12.

In the above-described embodiment, when connecting the connector 60 to the glass substrate 12b, the following operations are performed. First, the glass substrate 12b is inserted to the connector 60 in the insertion direction X as indicated in FIG. 8. The glass substrate 12b is fitted to the connector 60 between the contacts 62 of the contact mounting unit 64 and the lower wall 74 of the insulation unit 66. Next, the jig (not shown) is connected to the insulation unit 66, and by using the jig, the insulation unit 66 is moved relative to the contact mounting unit 64 such that the contacts 62 are resiliently connected to the electrodes 16a of the glass substrate 12b by the connection of the projections 80 and the cam grooves 72, to establish the electrical connection between the connector 60 (the contacts 62) and the glass substrate 12 (the electrodes 16a).

Further, in the above-described embodiment, the fixing unit 68 is attached to the contact mounting unlit 64 so that the contacts 62 of the contact mounting unit 64 are fixed.

A description will now be given of the connection structure of the connector 60 of the present embodiment and the glass substrate 12b with reference to FIG. 10 and FIG. 11.

As described earlier, FIG. 10 shows the connection structure of the connector 60 of the present embodiment and the glass substrate 12b before the insulation unit 66 is moved relative to the contact mounting unit 64. FIG. 11 shows the connection structure of the connector 60 of the present embodiment and the glass substrate 12b after the insulation unit 66 is moved relative to the contact mounting unit 64.

As shown in FIG. 10, after the glass substrate 12b is inserted to the connector 60 but before the insulation unit 66 is moved relative to the contact mounting unit 64, the leading edge of the glass substrate 12b is brought into contact with the vertical wall 70 of the contact mounting unit 64. The projections 80 of the insulation unit 66 at this time are connected to the low-level steps 72b of the cam grooves 72, and the rear wall 76 of the insulation unit 66 is separated from the vertical wall 70 of the contact mounting unit 64 in the direction X. Also, depending on the configuration of the cam groove 72, the insulation unit 66 is separated from the contact mounting unit 64 in the direction Z. Hence, the second contact portions 62b of the contacts 62 of the connector 60 at this time are separated from the electrodes 16a of the glass substrate 12b inserted to the connector 60.

In the present embodiment, the lower wall 74 of the insulation unit 66 includes, as shown in FIG. 10, a recess 75 at each of the sides of the lower wall 74 at the ends of the insulation unit 66 in the longitudinal direction Y, and these recesses 75 are provided at positions corresponding to the positions of the lugs 83 of the fixing unit 68.

When the connector 60 is set in the condition shown in FIG. 10, the jig is connected to the insulation unit 66, and, by using the jig, the insulation unit 66 is moved relative to the contact mounting unit 64 in both the direction X and the direction Z indicated in FIG. 10. The condition of the connector 60 is changed to the condition shown in FIG. 11.

As shown in FIG. 11, after the insulation unit 66 is moved relative to the contact mounting unit 64 in both the direction X and the direction Z, the projections 80 of the insulation unit 66 are fitted to the high-level steps 72b of the cam grooves 72 through the connection of the projections 80 and the cam grooves 72, and the projections 80 are connected to the contacts 62 such that the contacts 62 are downwardly depressed. By this movement, the position of the rear wall 76 of the insulation unit 66 is set to the nearest to the position of the vertical wall 70 of the contact mounting unit 64 in accordance with the configuration of the cam grooves 72. Hence, the contacts 62 of the contact mounting unit 64 are resiliently connected to the electrodes 16a of the glass substrate 12b. The contacts 62 at this time are firmly connected to the electrodes 16a due to the resilient depression of the contacts 62 by the projections 80. Consequently, the electrical connection between the connector 60 (the contacts 62) and the glass substrate 12 (the electrodes 16a) is established.

When the connector 60 is set in the condition shown in FIG. 11, the fixing unit 68 is attached to the contact mounting unit 64 from the upper position. The lugs 83 at the bottom of the leg portions 82 of the fixing unit 68 are fitted into the recesses 75 of the insulation unit 66, so that the contacts 62 of the contact mounting unit 64 are firmly and stably secured to the electrodes 16a of the glass substrate 12b. The contact mounting unit 64 and the insulation unit 66 are secured to each other by the connection of the lugs 83 and the recesses 75, which reliably prevents the separation of the contacts 62 from the electrodes 16a of the glass substrate 12b.

In the above-described embodiment, the connector 60 is configured such that the contacts 62 are resiliently connected to the electrodes 16a of the glass substrate 12b after the insulation unit 66 is moved relative to the contact mounting unit 64. The connector 60 can be easily connected to the substrate 12b by a one-touch operation, and can maintain the contact condition of the contacts 62 and the substrate electrodes 16a with adequate stability because of the connection of the projections 80 and the cam grooves 72. By using the cam grooves 72 having the desired configuration, the deformation or damaging of the contacts 62 or the electrodes 16a over an extended period of time, such as cases in which the connector connection and disconnection operations are repeated, is remarkably reduced.

Further, in the connector 60 of the above-described embodiment, the contacts 62 are arrayed in a staggered arrangement in which one of the first type and the second type is alternately used along the longitudinal line of the contact mounting unit 64. The connector 60 of the present embodiment is appropriate for use with the glass substrates of the plasma display 12 wherein the address lines 16 and the electrodes 16a are integrated with a high density and with a fine pitch.

Figure 12:
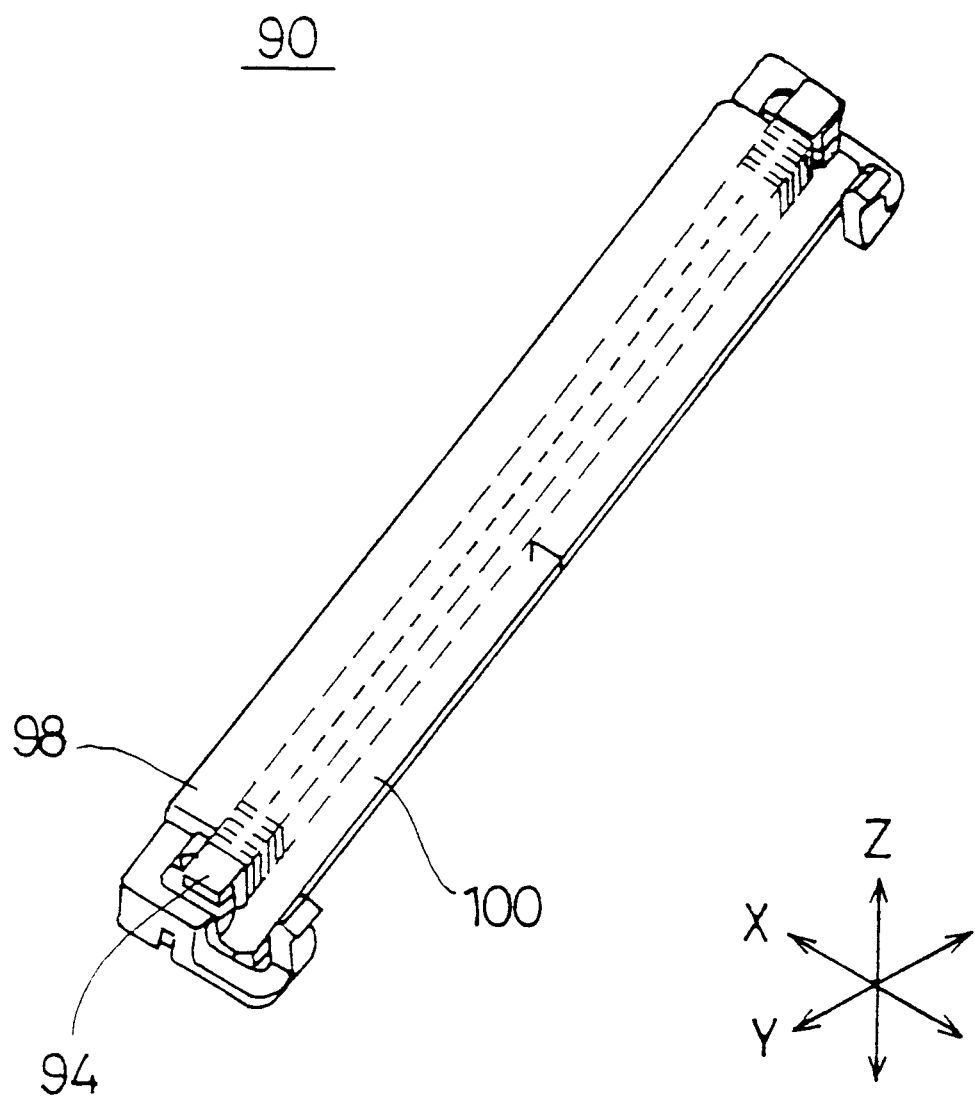
FIG. 12 is a perspective view of a third preferred embodiment of the connector of the present invention.

Next, FIG. 12 shows a connector 90 as a third preferred embodiment of the present invention.

Similar to the connector 10 of the first preferred embodiment, the connector 90 of the present embodiment is a connector connected to the glass substrate 12b of the plasma display 12. In FIG. 12, the connector 90 which is turned upside down is shown, and the contacts are placed on the top surface thereof.

Figure 13:
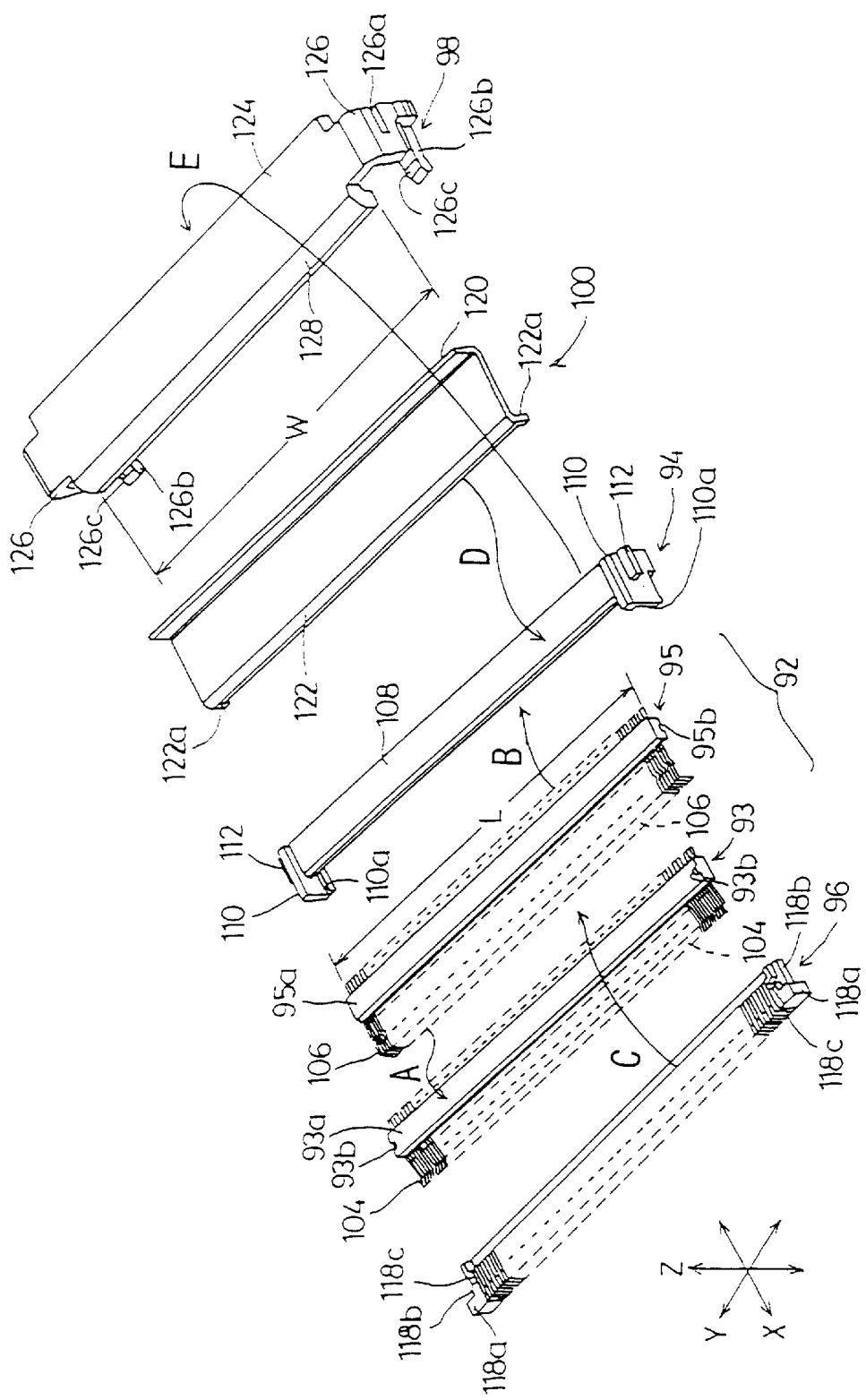
FIG. 13 is an exploded view of the connector of the present embodiment.
Figure 14A:
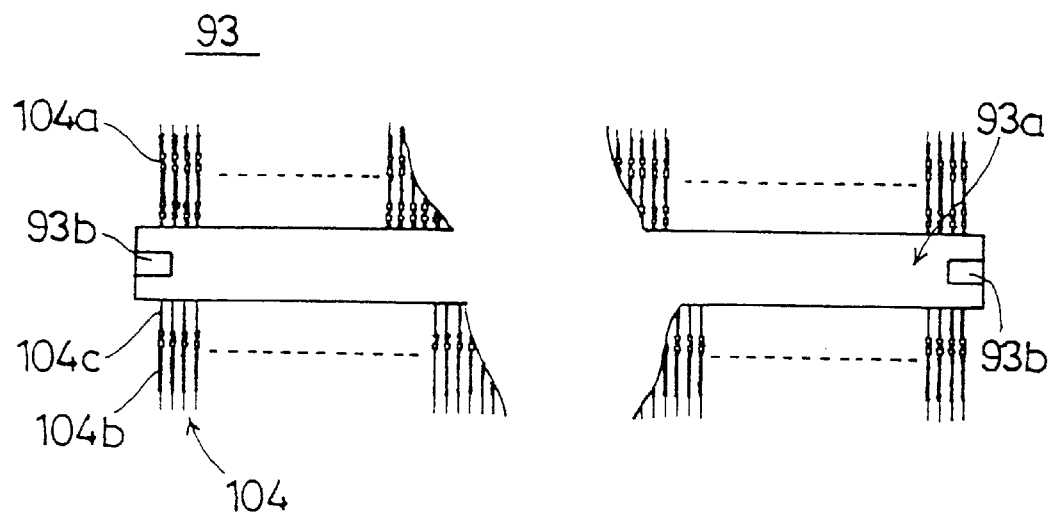
FIG. 14A, FIG. 14B and FIG. 14C are diagrams for explaining a contact mold portion in the connector of the present embodiment.
Figure 14B:
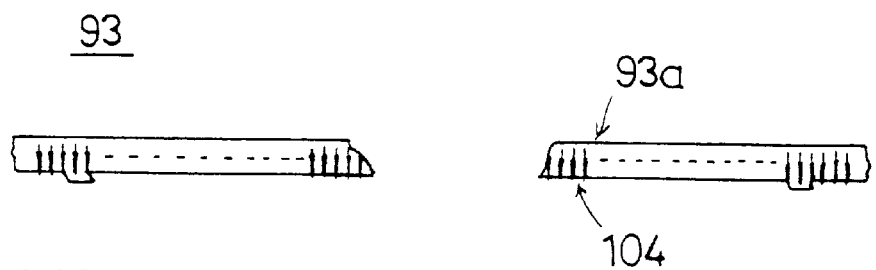
Figure 14C:
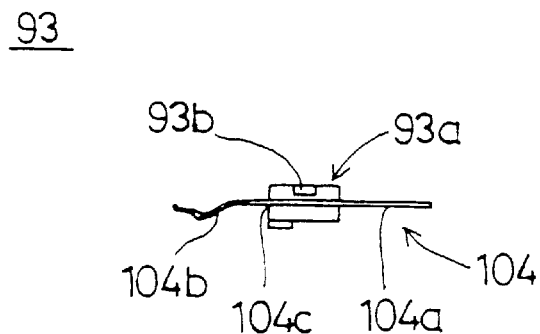
Figure 15A:
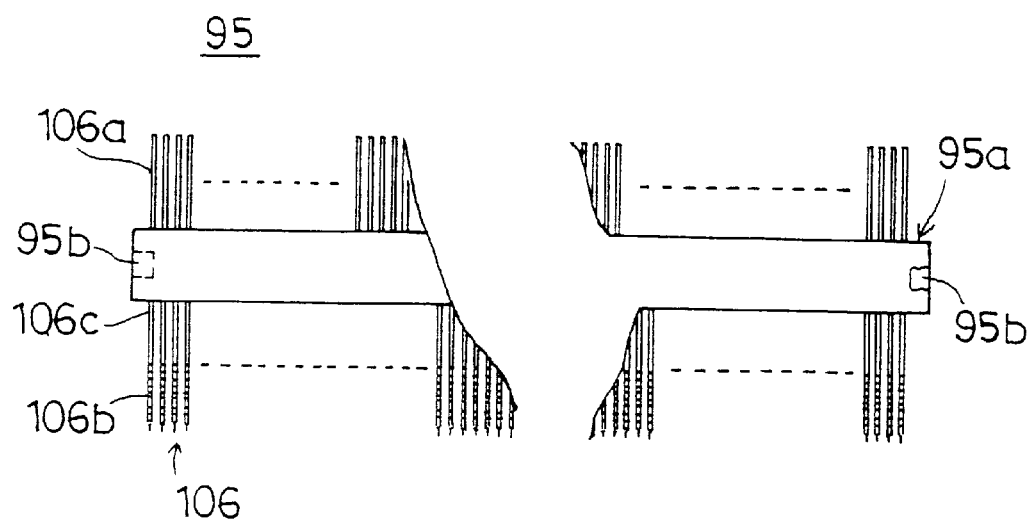
FIG. 15A, FIG. 15B and FIG. 15C are diagrams for an alternative contact mold portion in the connector of the present embodiment.
Figure 15B:
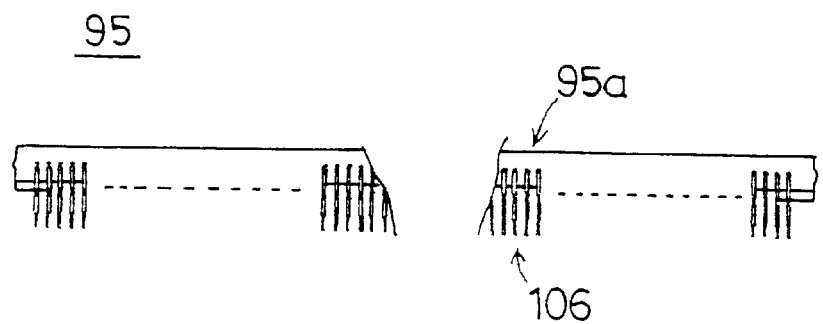
Figure 15C:
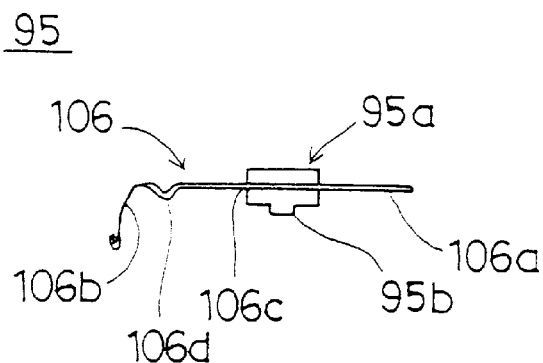
Figure 16A:
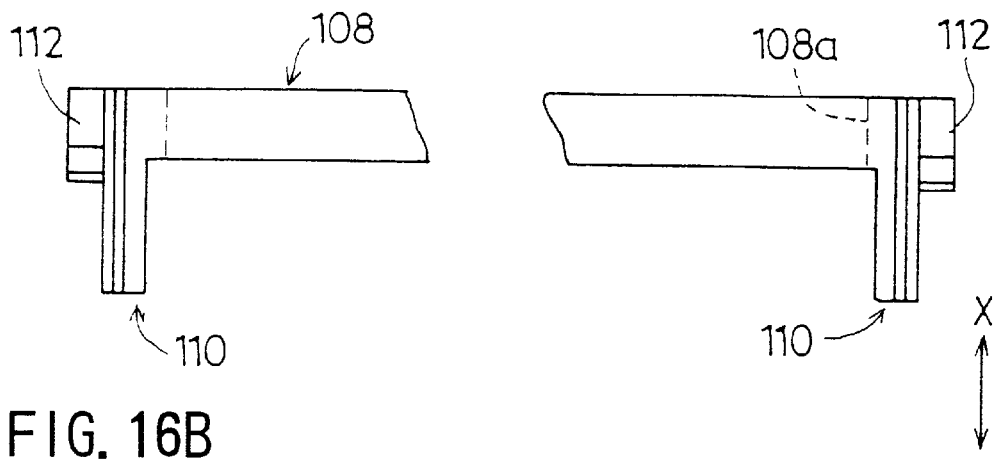
FIG. 16A, FIG. 16B and FIG. 16C are diagrams for explaining a contact mounting member of the connector of the present embodiment.
Figure 16B:
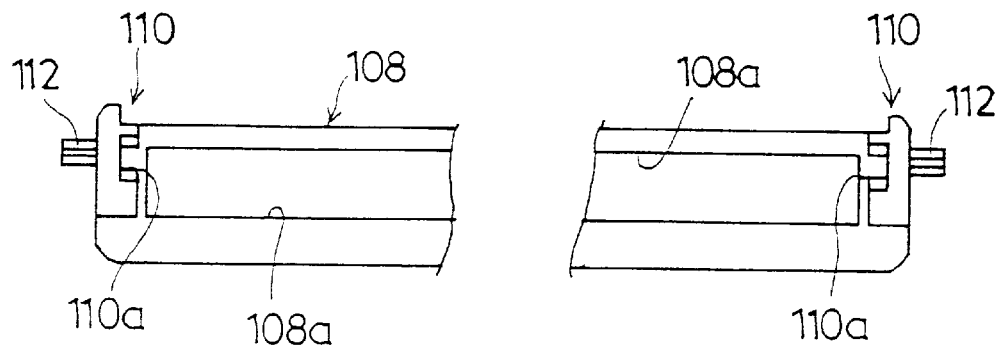
Figure 16C:
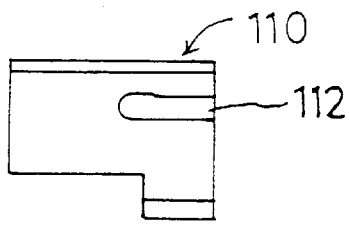
Figure 17A:
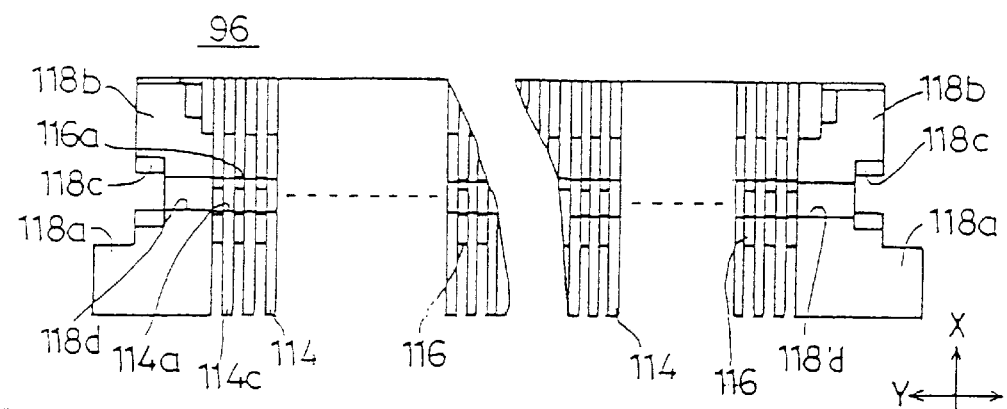
FIG. 17A, FIG. 17B, FIG. 17C and FIG. 17D are diagrams for explaining a slider member of the connector of the present embodiment.
Figure 17B:
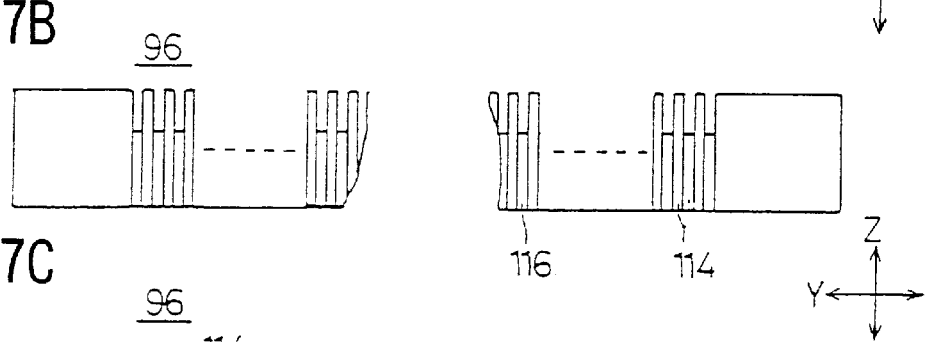
Figure 17C:
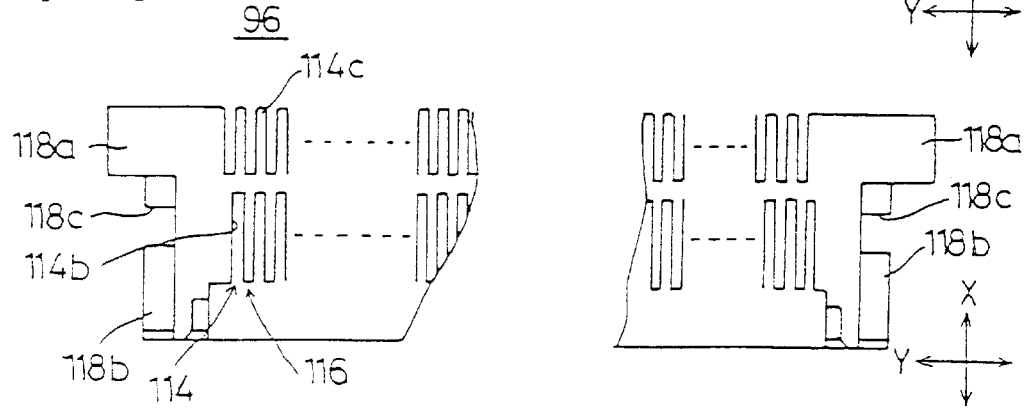
Figure 17D:
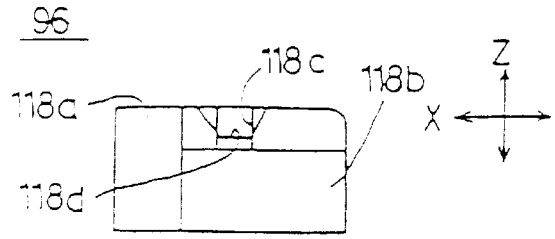
Figure 18:
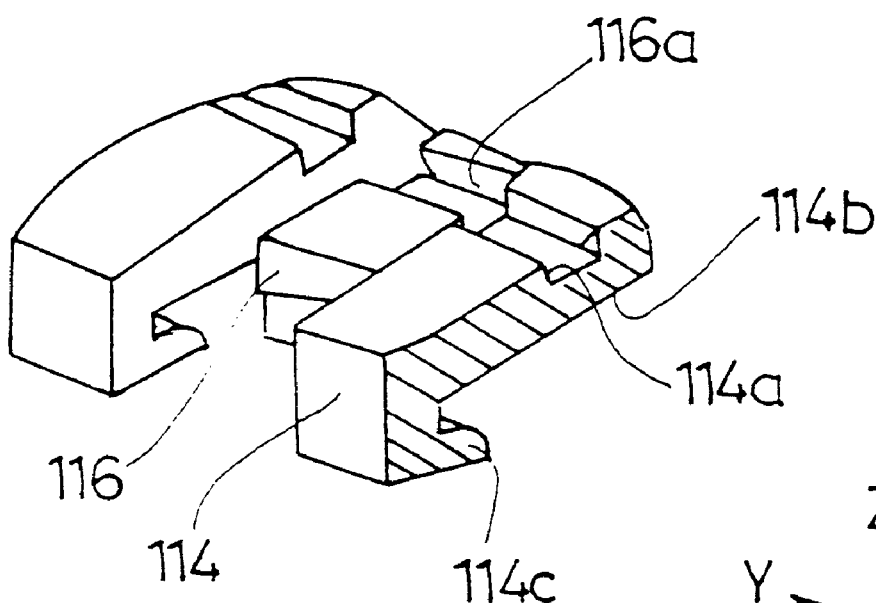
FIG. 18 is a perspective, partially cut-out view of the slider member of the connector of the present embodiment.

FIG. 13 is an exploded view of the connector 90 of the present embodiment. FIG. 14A, FIG. 14B, and FIG. 14C are diagrams for explaining a contact mold portion 93 in the connector of the present embodiment. FIG. 15A, FIG. 15B and FIG. 15C are diagrams for another contact mold portion 95 in the connector of the present embodiment. FIG. 16A, FIG. 16B and FIG. 16C are diagrams for explaining a contact mounting unit 94 of the connector of the present embodiment. FIG. 17A, FIG. 17B, FIG. 17C and FIG. 17D are diagrams for explaining a slider unit 96 of the connector of the present embodiment. FIG. 18 is a perspective, partially cut-out view of the slider unit 96 of the connector of the present embodiment.

As shown, the connector 90 of the present embodiment has a generally L-shaped cross-section that is taken along the line perpendicular to the longitudinal direction Y. The connector 90 generally includes a contact portion 92, a contact mounting unit 94, a slider unit 96, a shell unit 98, and a lever unit 100.

Unlike the connector 10 of the previous embodiment, the connector 90 of the present embodiment does not include the insulation unit 24 as in the connector 10, and does include the lever unit 100 which is not included in the connector 10.

In the present embodiment, the contact mounting unit 94 and the shell unit 98 form an insulator member that accommodates the contacts arranged in the contact portion 92.

In the connector 90 of the present embodiment, the contact portion 92 includes a contact mold portion 93 and a contact mold portion 95. The contact mold portion 93 contains a plurality of contacts 104 embedded in an insulator 93a and arrayed therein. The contact mold portion 95 contains a plurality of contact 106 embedded in an insulator 95a and arrayed therein. Each of the contact mold portions 93 and 95 is produced by performing an insert molding process. A pair of recesses 93b are provided at ends of the top surface of the insulator 93 in the longitudinal direction Y. A pair of projections 95b are provided at ends of the bottom surface of the insulator 95 in the longitudinal direction Y.

As shown in FIG. 14C, each of the contacts 104 is configured so that it includes a straight-line first contact portion 104a, a V-shaped second contact portion 104b, and a connecting portion 104c embedded in the insulator 93a. The connecting portion 104c interconnects the first contact portion 104a and the second contact portion 104b. As shown in FIG. 15C, each of the contacts 106 is configured so that it includes a straight-line first contact portion 106a, a V-shaped second contact portion 106b, and a connecting portion 106c embedded in the insulator 95a. The connecting portion 106c interconnects the first contact portion 106a and the second contact portion 106b. The second contact portions 106b are longer than the second contact portions 104b, and thus the contacts 106 are longer than the contacts 104 by the difference between the second contact portion 106b and the second contact portion 104b. Each contact 106 includes a downward projecting portion 106d between the second contact portion 106b and the connecting portion 106c.

As shown in FIG. 13, the contact mounting unit 94 includes a longitudinally extending contact mounting portion 108 and a pair of side walls 110 at the ends of the contact mounting portion 108 in the direction Y. As shown in FIG. 16B, the contact mounting portion 108 includes a hollow portion 108a internally provided in the contact mounting portion 108. A pair of projections 112 are provided on the outside surfaces of the side walls 110, and the projections 112 are extending in the direction X. A pair of recesses 110a are provided on the inside surfaces of the side walls 110, and the recesses 110a are extending in the direction X.

As shown in FIG. 13, the slider unit 96 is formed by using an insulating material. The slider unit 96 has a generally L-shaped cross-section that is taken along the line perpendicular to the longitudinal direction Y. As shown in FIG. 17A and FIG. 18, the slider unit 96 includes a plurality of large-width portions 114 and a plurality of small-width portions 116 which are alternately arranged in the longitudinal direction Y, of the slider unit 96. The small-width portions 116 are smaller in width (the direction X) than the large-width portions 114, and are slightly smaller in height (the direction Z) than the large-width portions 114. Each small-width portion 116 includes a flat surface portion and a recessed portion 116a adjacent to the flat surface portion. Each large-width portion 114 includes a flat surface portion and a recessed portion 114a adjacent to the flat surface portion. Each large-width portion 114 further includes a downward step portion and a lug 114c adjacent to the step portion. Each large-width portion 114 includes a grooved portion 114b on the bottom surface thereof, the grooved portion 114b is extending in the direction X.

Further, the slider unit 96 includes a projection 118a and a projection 118b at each of the ends of the slider unit 96 in the longitudinal direction Y. The slider unit 96 includes a slit 118c at each of the ends of the slider unit 96 in the longitudinal direction Y, and a pair of grooves 118d adjacent to the slits 118c.

As shown in FIG. 13, the lever unit 100 is a generally flat plate which is extending in the longitudinal direction Y. The lever unit 100 includes a vertical wall 120 upwardly extending from one side of the flat plate, and a vertical wall 122 downwardly extending from the other side of the flat plate. The lever unit 100 further includes a pair of downward projections 122a at the bottom of the vertical wall 122.

The shell unit 98 is formed by using an insulating material, and it is a generally flat plate. As shown in FIG. 13, the shell unit 98 includes an upper surface 124, a pair of side walls 126 at the ends of the upper surface 124 in the longitudinal direction Y, and a front wall 128 downwardly extending from one side of the upper wall 124 in the direction X. Each of the, side walls 126 includes a cut-out portion 126a in the middle of the side wall, a guide portion 126b at the bottom of the side wall, and a projection 126c on the guide portion 126b. Each of the guide portions 126b are rounded. Each of the projections 126c is provided at the end of the guide portion 126b in the direction X. The upper surfaces of the guide portions 126b are formed to be flat and smooth by using a rolling machine. The front wall 128 has a width W in the longitudinal direction Y which is smaller than a distance L between the ends of the contacts 104 (or the ends of the contacts 106) of the contact portion 92.

When assembling the above-described components into the connector 90 of the present embodiment, the following assembly processes are performed.

First, the projections 95b of the contact mold portion 95 are fitted into the recesses 93b of the contact mold portion 93, and the two contact mold portions 93 and 95 are connected together to form the contact portion 92 (indicated by the arrow A in FIG. 13). Second, the insulators 93a and 95a of the contact portion 92 are fitted into the hollow portion 108a of the, contact mounting unit 94, and the contact portion 92 is attached to the contact mounting unit 94 (indicated by the arrow B in FIG. 13).

Third, the contacts 106 are fitted to the upper surfaces of the small-width portions 116 of the slider unit 96, and the contacts 104 are fitted to the lower surfaces of the large-width portions 114 of the slider unit 96. Moreover, the projections 118b of the slider unit 96 are fitted into the recesses 110a of the contact mounting unit 94, and the slider unit 96 is attached to the contact mounting unit 94 (indicated by the arrow C in FIG. 13).

Fourth, the lever unit 100 is placed onto the contact mounting unit 94, the projections 122a of the lever unit 100 are fitted to the slits 118c of the slider unit 96, and the downward vertical wall 122 of the lever unit 100 is fitted to the recessed portion 114a of the slider unit 96. Hence, the lever unit 100 is attached to the slider unit 96 (indicated by the arrow D in FIG. 13).

Finally, the projections 122 of the contact mounting unit 94 are fitted to the cut-out portions 126a of the shell unit 98, and the shell unit 98 is attached to the contact mounting unit 94 (indicated by the arrow E in FIG. 13).

By carrying out the above assembly processes, the components are assembled together so that the connector 90 of the present embodiment is provided as the final product.

Figure 19:
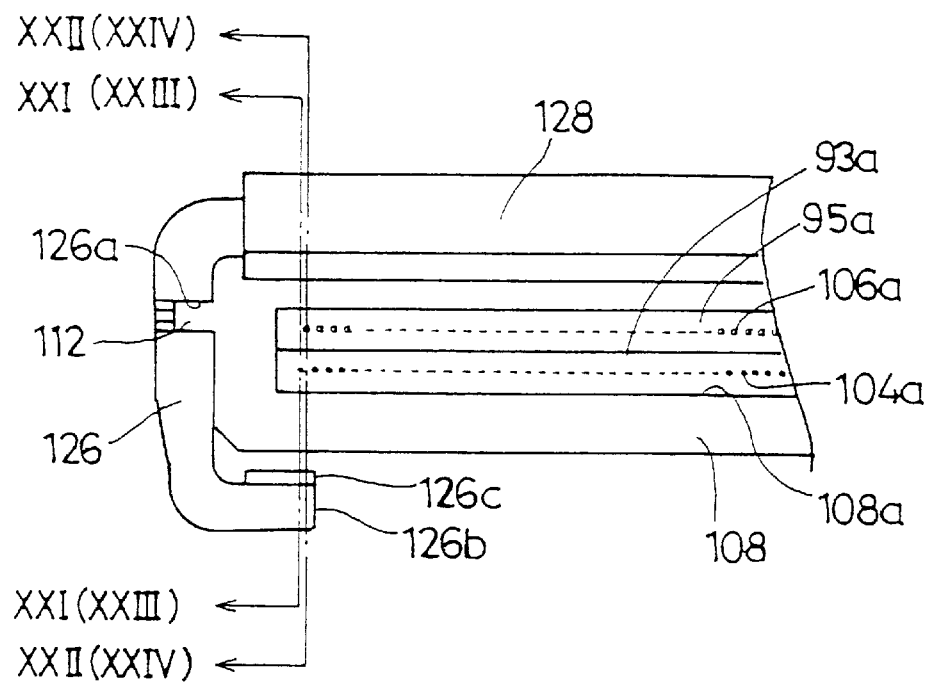
FIG. 19 is an enlarged rear view of the connector of the present embodiment.
Figure 20:
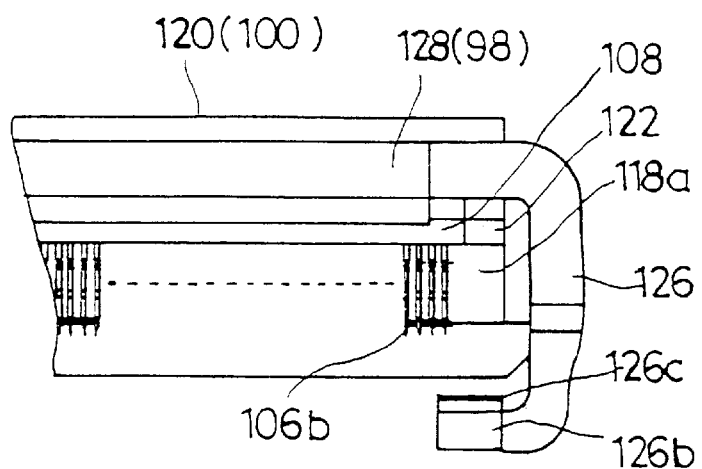
FIG. 20 is an enlarged front view of the connector of the present embodiment.

FIG. 19 is an enlarged rear view of the connector 90 of the present embodiment after assembly. FIG. 20 is an enlarged front view of the connector 90 of the present embodiment after assembly.

In FIG. 19, the first contact portions 104a and 106a of the contacts 104 and 106 are shown. In FIG. 20, the second contact portions 106b of the contacts 106 are shown (the second contact portions 104b of the contacts 104 are concealed).

In the present embodiment, the connector 90 is configured such that the slider unit 96 is movable in the direction X by pushing the vertical wall 120 of the lever unit 100 by the operator's finger.

A description will now be given of the connection structure of the connector 90 and the glass substrate 12b with reference to FIG. 21 through FIG. 24.

Figure 21:
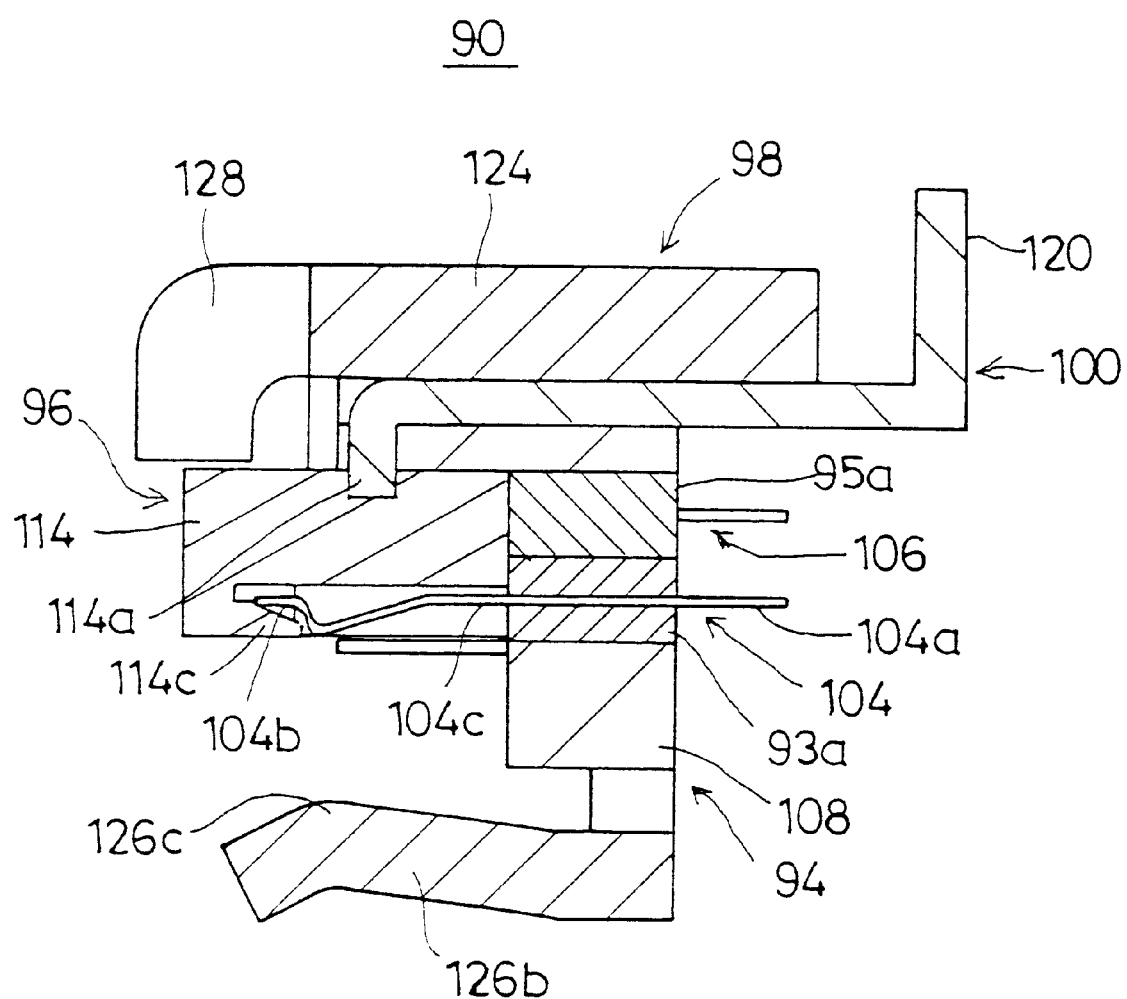
FIG. 21 is a cross-sectional view of the connector of the present embodiment before connection of the connector and the glass substrate is complete, which is taken along the line XXI—XXI in FIG. 19.
Figure 22:
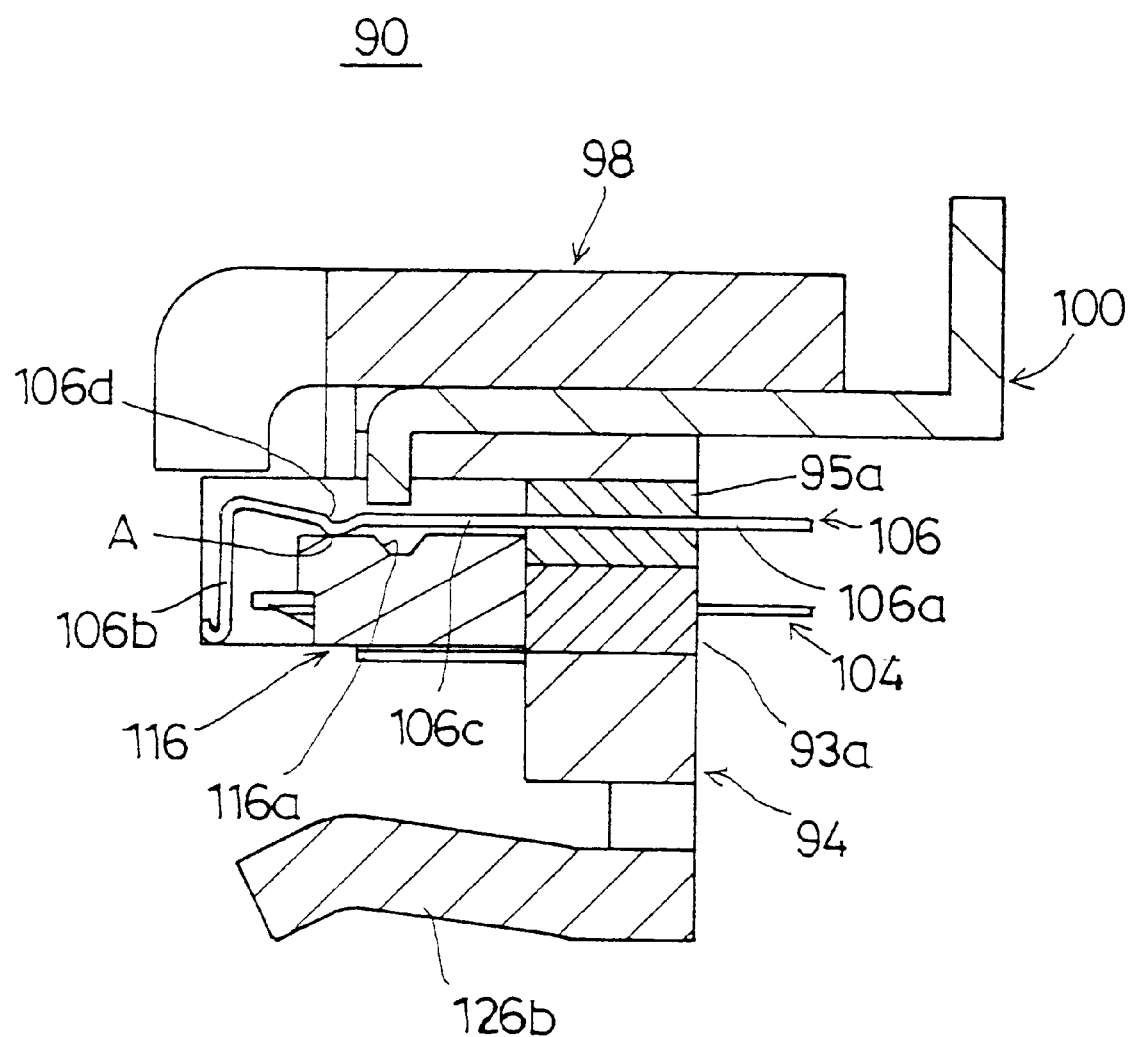
FIG. 22 is a cross-sectional view of the connector of the present embodiment before connection of the connector and the glass substrate is complete, which is taken along the line XXII—XXII in FIG. 19.

FIG. 21 is a cross-sectional view of the connector 90 of the present embodiment before connection of the connector and the glass substrate is complete, which is taken along the line XXI—XXI in FIG. 19. FIG. 22 is a cross-sectional view of the connector 90 of the present embodiment before the connection of the connector and the glass substrate is complete, which is taken along the line XXII—XXII in FIG. 19.

As shown in FIG. 21 and FIG. 22, before the connection of the connector 90 and the glass substrate 12b is complete, the lever unit 100 is set at the right-end position on the upper surface 108 of the contact mounting unit 94. As the lever unit 100 is connected to the slider unit 96, the slider unit 96 is also set at the right-end position, and the slider unit 96 at this position is brought into contact with the contact mold portions 93 and 95 of the contact portion 92.

The second contact portions 104b of the contacts 104 at this time are, as shown in FIG. 21, placed on the lugs 114c of the large-width portions 114 of the slider unit 96. The leading edges of the second contact portions 104b are upwardly biased by the connection of the lugs 114c and the second contact portions 104b. On the other hand, the downward projecting portions 106d of the contacts 106 at this time are, as shown in FIG. 22, fitted onto the flat surfaces (indicated by A in FIG. 22) of the small-width portions 116 of the slider unit 96. The intermediate parts of the second contact portions 106b of the contacts 106 are upwardly biased by the connection of the projecting portions 106d and the small-width portions 116.

With the connector 90 being set in the condition shown in FIG. 21 and FIG. 22, the glass substrate 12b is inserted to the connector 90, and the slider unit 96 and the lever unit 100 are moved together relative to the contact mounting unit 94 in the direction X (or the left direction) by pushing the vertical wall 120 of the lever unit 100 by the operator's finger. The connector 90 is then set in the condition shown in FIG. 23 and FIG. 24.

Figure 23:
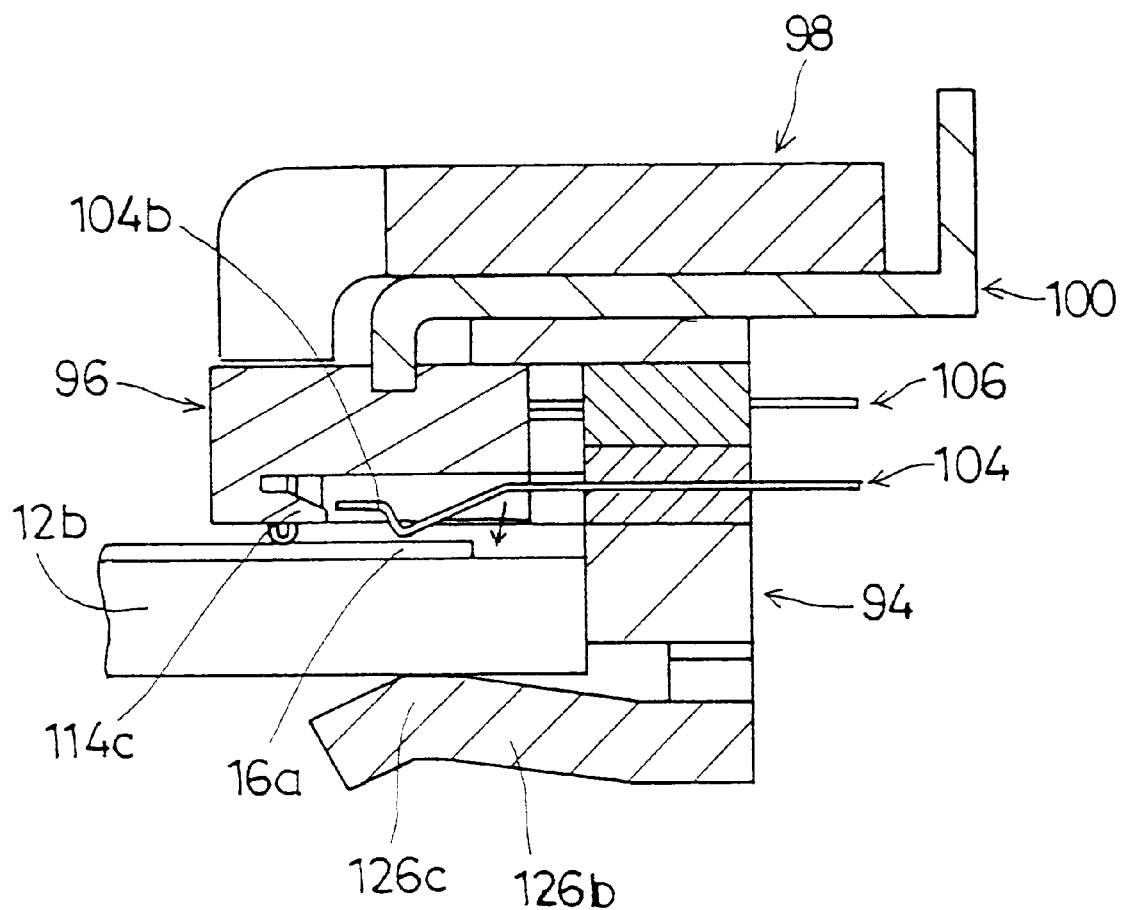
FIG. 23 is a cross-sectional view of the connector of the present embodiment after the connection of the connector and the glass substrate is complete, which is taken along the line XXIII—XXIII in FIG. 19.
Figure 24:
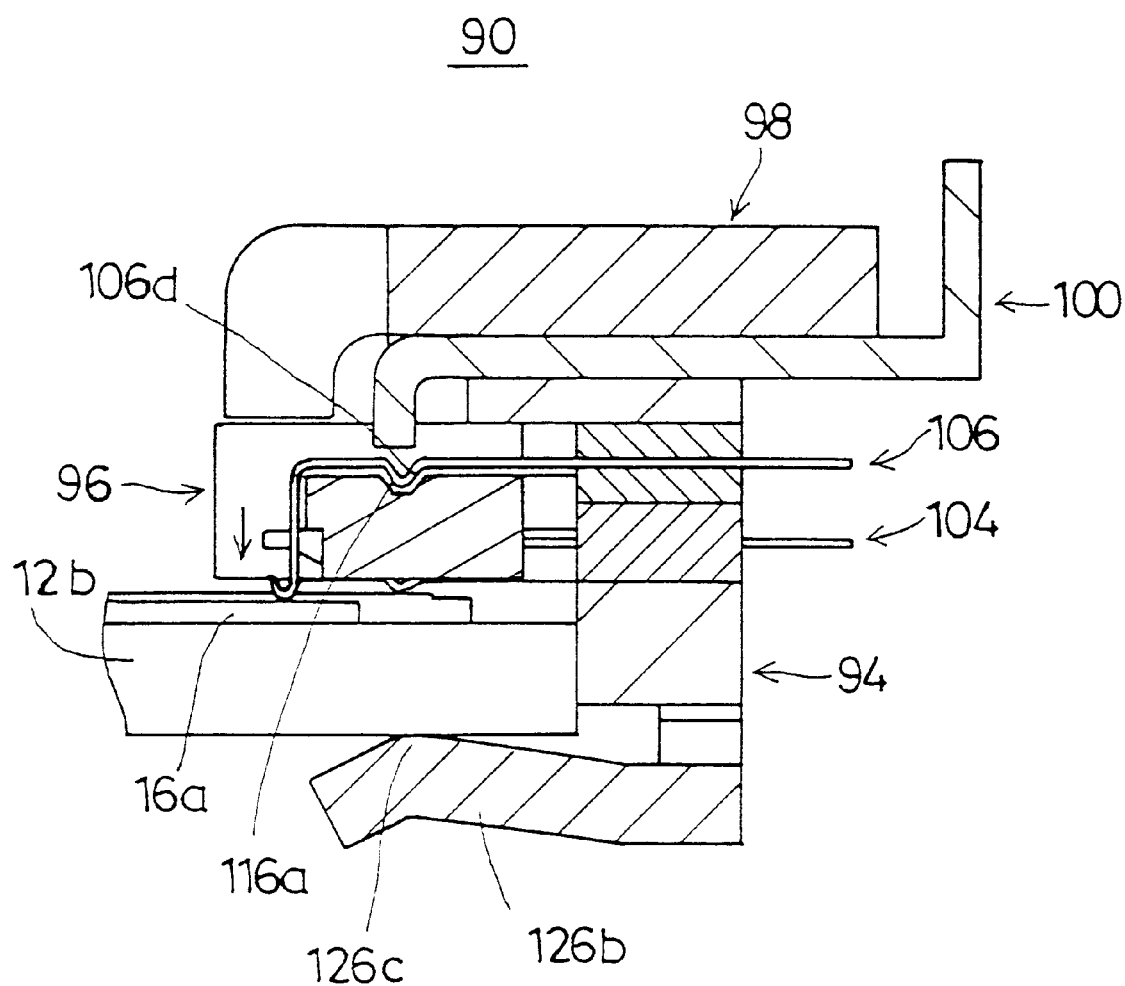
FIG. 24 is a cross-sectional view of the connector of the present embodiment after the connection of the connector and the glass substrate is complete, which is taken along the line XXIV—XXIV in FIG. 19.

FIG. 23 is a cross-sectional view of the connector 90 of the present embodiment after the connection of the connector 90 and the glass substrate 12b is complete, which is taken along the line XXIII—XXIII in FIG. 19. FIG. 24 is a cross-sectional view of the connector 90 of the present embodiment after the connection of the connector 90 and the glass substrate 12b is complete, which is taken along the line XXIV—XXIV in FIG. 19. For the sake of convenience of illustration, the cross-section of the glass substrate 12b is indicated as hollow portion, and the hatching lines of the glass plate 12b are omitted.

As shown in FIG. 23 and FIG. 24, the insertion of the glass substrate 12b is guided by the guide portions 126b of the side walls 126, and the leading edge of the glass substrate 12b is placed into the connector 90. At this time, the electrodes 16a on the top of the glass substrate 12b are not in contact with the second contact portions of the contacts 104 and 106 because the contacts 104 and 106 are upwardly biased as described above. Substantially no frictional force is required when the glass substrate 12b is inserted to the connector 90 because the bottom surface of the glass substrate 12b and the top surface of the guide portions 126b are flat and smooth.

FIG. 25 is a diagram for explaining a method of position matching of the connector 90 of the present embodiment.

As shown in FIG. 25, immediately before the glass substrate 12b touches the contact mold portions 93 and 95 of the contact portion 92, the lugs 114c of the slider unit 96 and the second contact portions 106b of the contacts 106 are viewed from the above as shown in FIG. 25, and the position matching is performed such that the positions of the contacts 104 and 106 match with the positions of the electrodes 16a.

After the glass substrate 12b is inserted to the connector 90 as shown in FIG. 23 and FIG. 24, the slider unit 96 is moved relative to the contact mounting unit 94 in the direction X (or the left direction) by pushing the vertical wall 120 of the lever unit 100 by the operator's finger. By this movement of the slider unit 96, the second contact portions 104b of the contacts 104 are disconnected from the lugs 114c of the large-width portions 114 of the slider unit 96 (FIG. 23). Further, by this movement of the slider unit 96, the downward projecting portions 106d of the contacts 106 are displaced from the flat surfaces of the small-width portions 116 of the slider unit 96 and fitted to the recessed portions 116a of the small-width portions 116 of the slider unit 96 (FIG. 24). The connecting portions 104c and 106c of the contacts 104 and 106 are fixed to the contact mounting unit 94, and the second contact portions 104b and 106b of the contacts 104 and 106 are resiliently connected to the electrodes 16a of the glass substrate 12b due to the spring force of the contacts 104 and 106. The contacts 104 and 106 at this time are firmly and stably connected to the electrodes 16a of the glass substrate 12b. Consequently, the electrical connection between the connector 90 (the contacts 104 and 106) and the glass substrate 12b (the electrodes 16a) is established.

In the present embodiment, when disconnecting the connector 90 from the glass substrate 12b in the condition shown in FIG. 23 and FIG. 24 (e.g., for the purpose of performing a repair work on the connector 90), the slider unit 96 is reversely moved relative to the contact mounting unit 94 in the direction X by pushing the vertical wall 120 of the lever unit 100 by the operator's finger, so that the connector 90 is returned to the condition shown in FIG. 21 and FIG. 22. When the connector 90 is set in the condition shown in FIG. 21 and FIG. 22,.the connector 90 can be easily removed from the glass substrate 12b. No substantial frictional force is exerted on the contacts 104 and 106 or the electrodes 16a when disconnecting the connector 90 from the glass substrate 12b.

In the above-described embodiment, the connector 90 is configured such that the contacts 104 and 106 are separated from the electrodes of the substrate 12b before the slider unit 96 is moved relative to the contact mounting unit 94. No substantial frictional force is required when the substrate 12b is inserted to or removed from the connector 90, which prevents the damaging of the substrate electrodes 16a or the connector contacts 104 and 106. Further, the connector 90 is configured such that the contacts 104 and 106 are resiliently connected to the electrodes 16a after the slider unit 96 is moved relative to the contact mounting unit 94. The connector 90 can be easily connected to the substrate 12b by a one-touch operation, and can maintain the contact condition of the contacts 104 and 106 and the electrodes 16a with adequate stability because of the spring force of the contacts 104 and 106. The deformation or damaging of the contacts 104 and 106 over an extended period of time as in the conventional connector is remarkably reduced.

Further, in the connector 90 of the above-described embodiment, the contacts 104 and the contacts 106 are arrayed in a staggered arrangement, and the slider unit 96 includes the large-width portions 114 and the small-width portions 116 that are respectively connected to the contacts 104 and the contacts 106. The second contact portions 106b of the relatively long contacts 106 are fitted onto the flat surfaces (indicated by A in FIG. 22) of the small-width portions 116 of the slider unit 96. The lugs 32a of the slider unit 22 of the connector 10 in the previous embodiment are not used in the present embodiment. It is possible for the connector 90 of the present embodiment to reduce the length of the slider unit 96 in the longitudinal direction Y and provide a small-size connector.

Alternatively, if the reduction of the slider unit 96 in the longitudinal direction Y is not done, the length of the relatively short contacts 104 under the relatively long contacts 106 may be increased. In such alternative embodiment, the spring force of the contacts 104 can be increased to achieve increased stability of the contact condition of the contacts 104 and 106 and the electrodes 16a.

Further, in the connector 90 of the above-described embodiment, the slider unit 96 can be easily moved relative to the contact mounting unit 94 by pushing the vertical wall 120 of the lever unit 100. Further, the position matching of the connector 90 can be accurately carried out by visual inspection of the contact condition of the contacts 104 and 106 and the electrodes 16a at the ends thereof.

Further, in the connector 90 of the above-described embodiment, when the connector 90 is connected to or disconnected from the glass substrate 12b, the smooth rounded projections 126c of the shell unit 98 are brought into contact with the glass substrate 12b. Thus, it is possible for the connector 90 of the present embodiment to avoid the damaging of the glass substrate 12b during the connecting or disconnecting operation.

Further, the connector 90 of the above-described embodiment is configured such that the two adjacent ones of the contacts 104 and 106 are separated from each other by the slider unit 96. Thus, it is possible for the connector 90 of the present embodiment to prevent the short-circuiting of the two adjacent contacts during the connecting or disconnecting operation.

Figure 26:
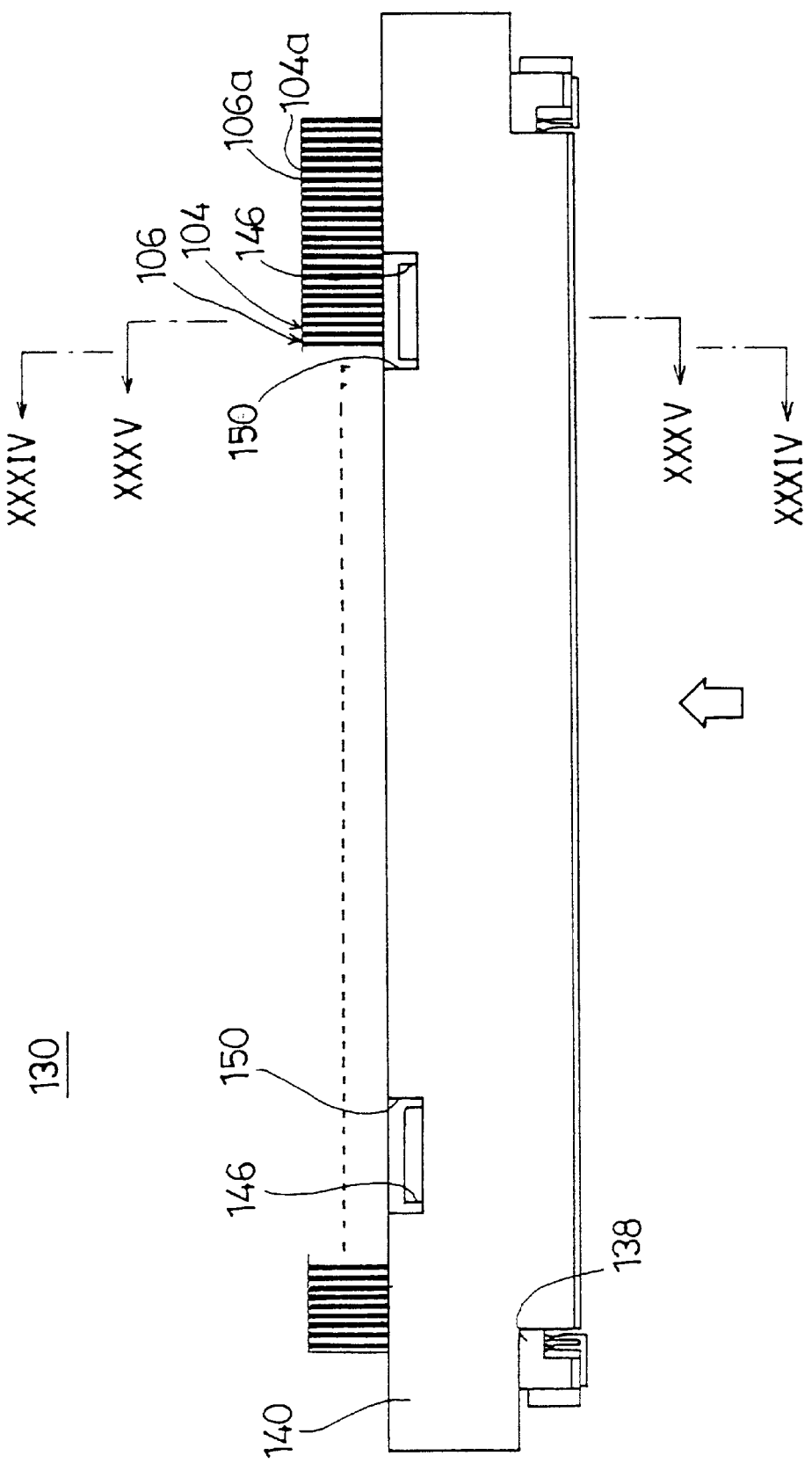
FIG. 26 is a top view of a fourth preferred embodiment of the connector of the present invention.

Next, FIG. 26 shows a connector 130 as a fourth preferred embodiment of the present invention.

Similar to the connector 10 of the first preferred embodiment, the connector 130 of the present embodiment is a connector connected to the glass substrate 12b of the plasma display 12.

Figure 27:
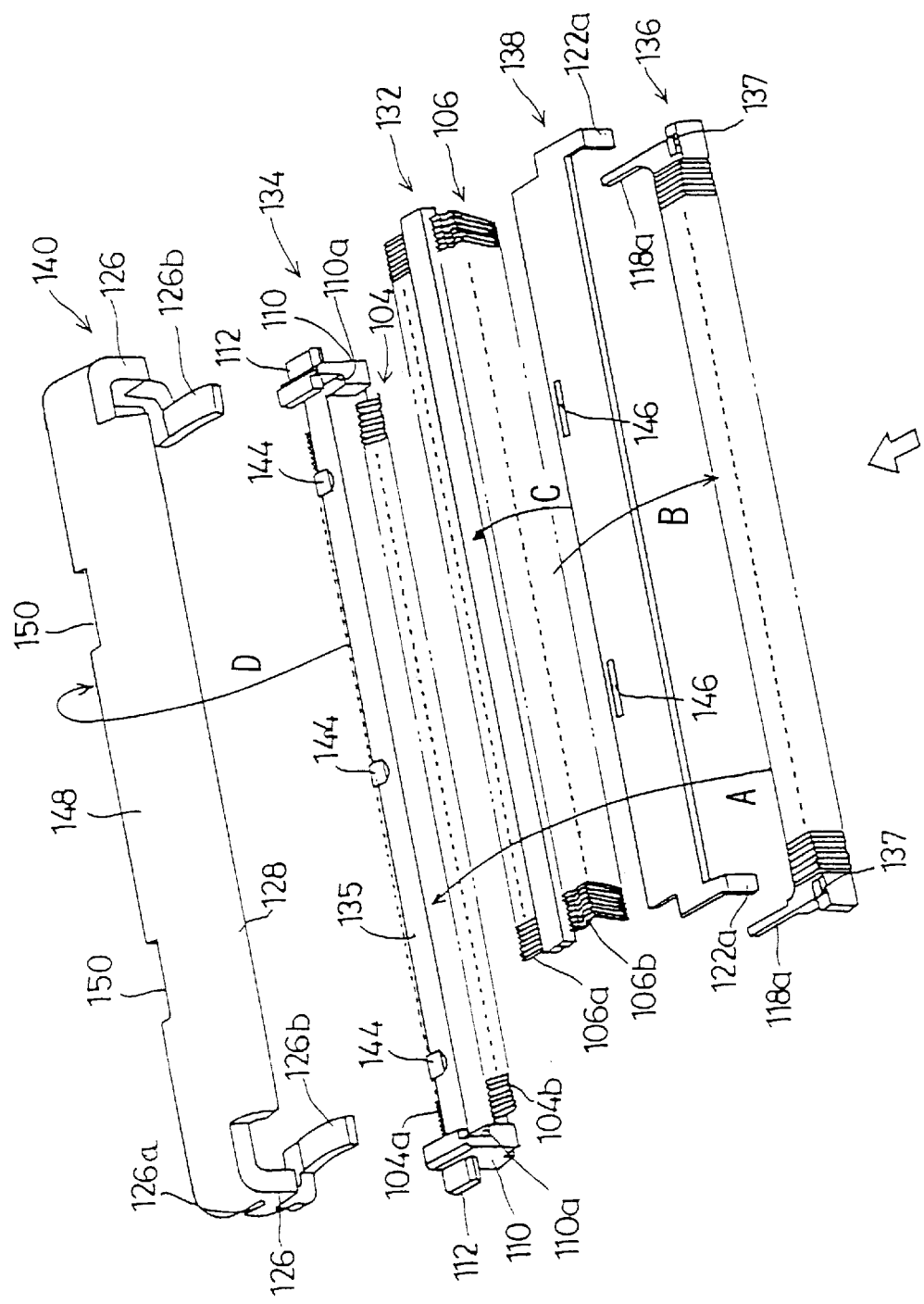
FIG. 27 is an exploded view of the connector of the present embodiment.
Figure 28:
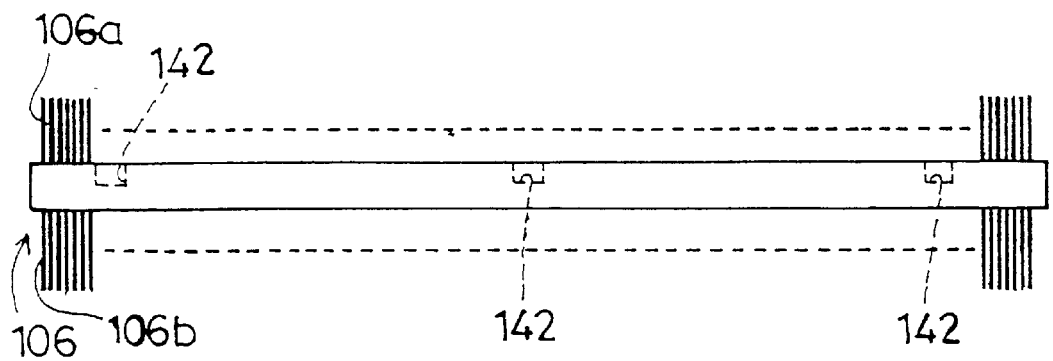
FIG. 28 is a top view of a first contact mold portion in the connector of the present embodiment.
Figure 29:
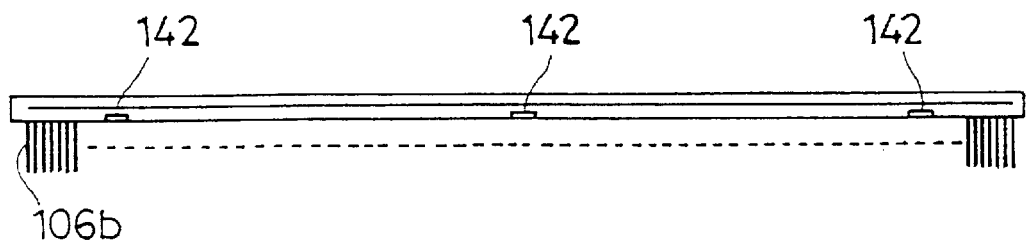
FIG. 29 is a front view of the first contact mold portion in the connector of the present embodiment.
Figure 30:
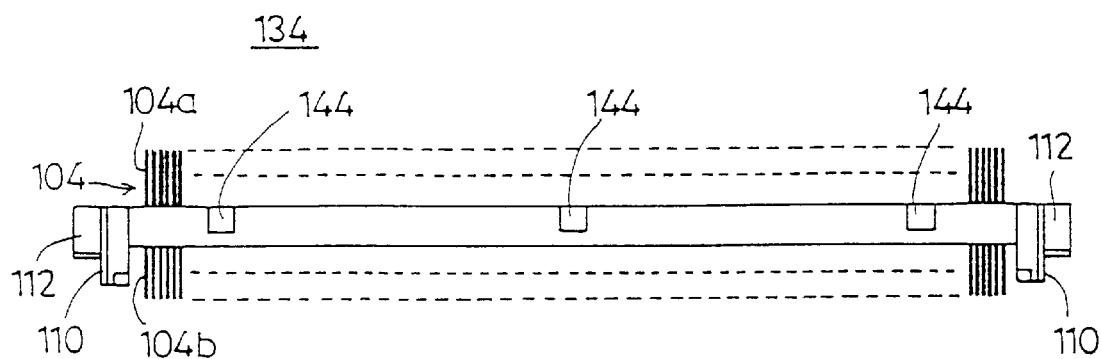
FIG. 30 is a top view of a second contact mold portion in the connector of the present embodiment.
Figure 31:
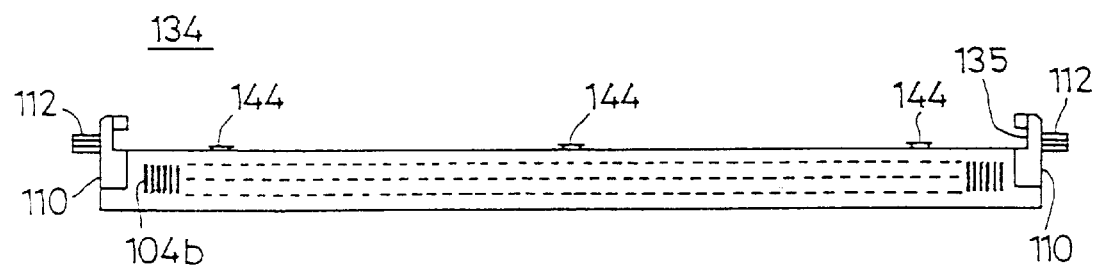
FIG. 31 is a front view of the second contact mold portion in the connector of the present embodiment.
Figure 32:
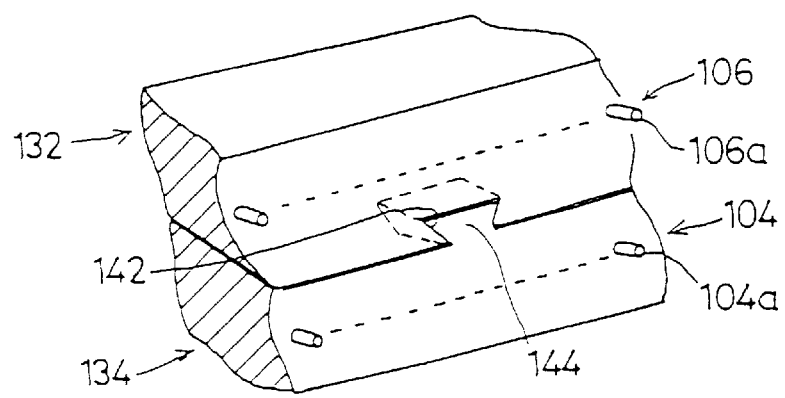
FIG. 32 is a perspective view of the first and second contact mold portions in the connector of the present embodiment after assembly.
Figure 33:
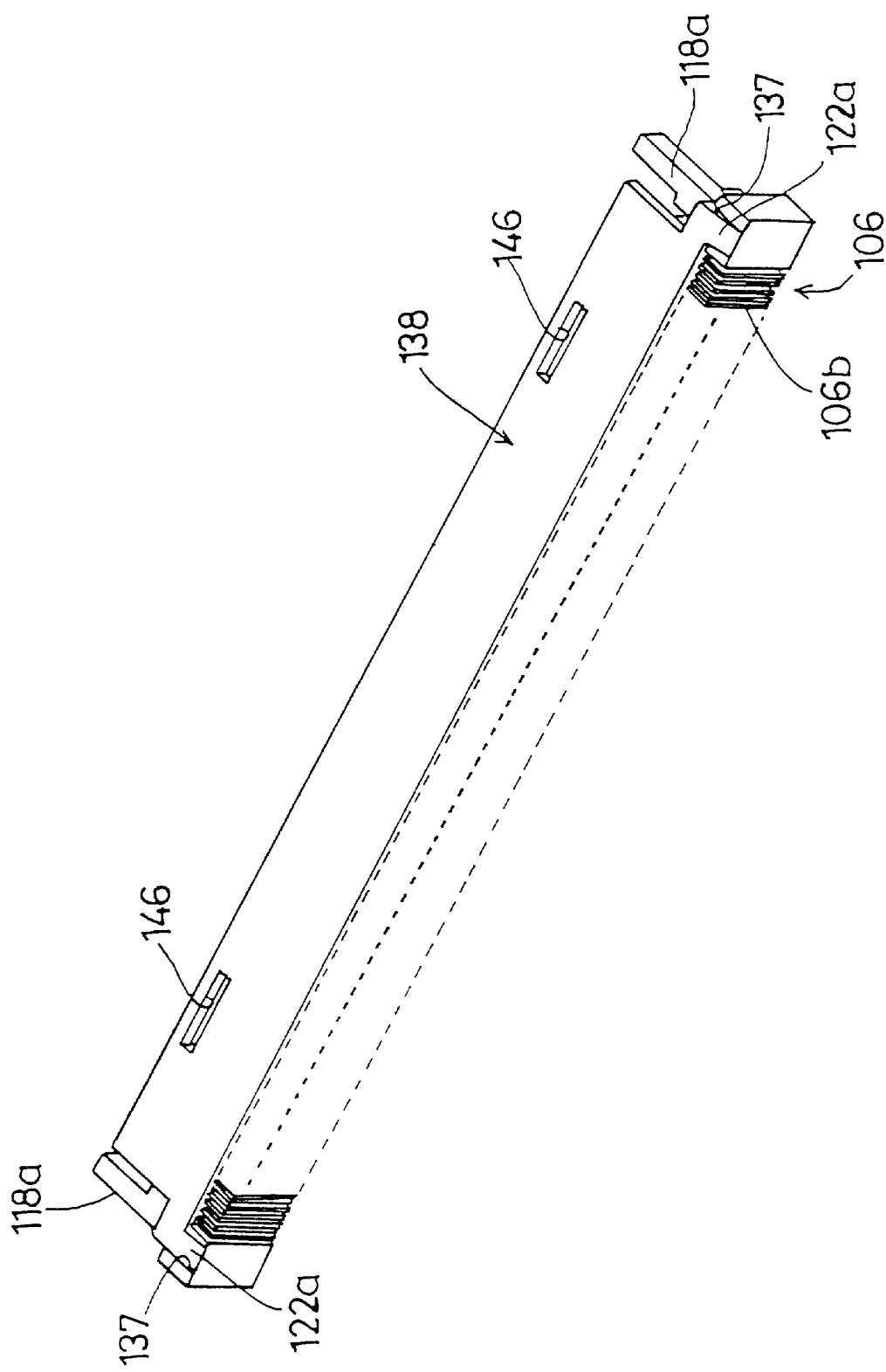
FIG. 33 is a perspective view of the connector of the present embodiment after assembly in which a shell member is removed therefrom.

FIG. 27 is an exploded view of the connector 130 of the present embodiment. FIG. 28 is a top view of a first contact mold portion in the connector 130 of the present embodiment. FIG. 29 is a front view of the first contact mold portion in the connector 130 of the present embodiment. FIG. 30 is a top view of a second contact mold portion in the connector 130 of the present embodiment. FIG. 31 is a front view of the second contact mold portion in the connector 130 of the present embodiment. FIG. 32 is a perspective view of the first and second contact mold portions in the connector 130 of the present embodiment after assembly. FIG. 33 is a perspective view of the connector 130 of the present embodiment after assembly in which a shell member is removed therefrom.

As shown, the connector 130 of the present embodiment has a generally L-shaped cross-section that is taken along the line perpendicular to the longitudinal direction Y. The connector 130 generally includes a first contact mold portion 132, a second contact mold portion 134, a slider unit 136, a lever unit 138, and a shell unit 140.

In FIG. 26 and FIG. 27, the hollow arrow indicates the direction of insertion of the glass substrate 12b to the connector 130.

The connector 130 of the present embodiment is essentially the same as the connector 90 of the previous embodiment except that the connector 130 of the present embodiment does not include the contact mounting unit 94 in the connector 90. In the connector 130 of the present embodiment, the first contact mold portion 132 containing the upper contacts 106 is produced by performing an insert molding process, and the second contact mold portion 134 containing the lower contacts 104 is produced by performing an insert molding process. The contact mold portions 132 and 134 in the present embodiment are essentially the same as the contact mold portions 93 and 95 in the connector 90 of the previous embodiment.

In the present embodiment, the contact mold portion 132 has a generally rectangular cross-section that is taken along the line perpendicular to the longitudinal direction. As shown in FIG. 28, the contact mold portion 132 containing the upper contacts 106 is produced by performing an insert molding process. A plurality of recesses 142 are provided on the side of the contact mold portion 132 from which the first contact portions 106a of the contacts 106 are projecting. Each of the recesses 142 are open to both the up direction in FIG. 28 and the down direction in FIG. 29. Each of the recesses 142 has an inverted trapezoidal cross-section that is taken along the line perpendicular to the longitudinal direction of the contacts 106, and the downside opening of the recess is narrow as shown in FIG. 32.

The contact mold portion 134 has a generally rectangular cross-section that is taken along the line perpendicular to the longitudinal direction. As shown in FIG. 30, the contact mold portion 134 containing the lower contacts 104 is produced by performing an insert molding process. A pair of grooves 135 are provided at the upper positions of the side walls 110 at the ends of the contact mold portion 134 in the longitudinal direction. A plurality of projections 144 are provided on the side of the contact mold portion 134 from which the first contact portions 104a of the contacts 104 are projecting. Each of the projections 144 has an inverted trapezoidal cross-section that is taken along the line perpendicular to the longitudinal direction of the contacts 104, and the up-side section of the projection is wide as shown in FIG. 32.

Similar to the contact mounting unit 94 of the connector 90, the contact mold portion 134 has the side walls 110 at the ends of the contact mold portion 134 in the longitudinal direction, and the projections 112 are provided on the side walls 110.

In the connector 130 of the present embodiment, the slider unit 136 includes the projections 118a that are similar to the projections of the slider unit in the connector 90 of the previous embodiment. The slider unit 136 includes openings 137 that are similar to the slits 118c of the slider unit in the connector 90.

In the connector 130 of the present embodiment, the lever unit 138 is configured in a manner different from that of the lever unit in the connector 90 of the previous embodiment. The lever unit 138 is formed by using a metallic material into a generally flat plate that extends in the longitudinal direction. The lever unit 138 includes no vertical walls that are provided in the lever unit 100. The lever unit 138 includes a set of cut-out portion 146 on the side of the lever unit 138 to which the contact mold portions 132 and 134 are attached, and the cut-out portions 146 are arrayed in the longitudinal direction. The lever unit 138 further includes the downward projections 122a at the bottom of the lever unit, which are similar to those of the lever unit 100 of the previous embodiment.

The shell unit 140 is formed by using an insulating material, and it is a generally flat plate. As shown in FIG. 27, the shell unit 140 includes an upper surface 148 and the side walls 126 at the ends of the upper surface 148 in the longitudinal direction. Each of the side walls 126 includes the cut-out portion 126a in the middle of the side wall and the guide portion 126b at the bottom of the side wall. The shell unit 140 includes a set of cut-out portions 150 on the side of the upper surface 148, and when the shell unit 140 is attached to the connector 130, the cut-out portions 146 of the lever unit 138 are uncovered with the shell unit 140 because of the use of the cut-out portions 150.

When assembling the above-described components into the connector 130 of the present embodiment, the following assembly processes are performed.

First, the projections 118a of the slider unit 136 are fitted into the recesses 110a of the contact mold portion 134, and the slider unit 136 is connected to the grooves 135 of the contact mold portion 134 (indicated by the arrow A in FIG. 27).

Second, the contact mold portion 132 is placed onto the slider unit 136, the projections 144 of the contact mold portion 134 are fitted to the recesses 142 of the contact mold portion 132, and the contact mold portions 132 and 134 are connected together (indicated by the arrow B in FIG. 27).

Third, the projections 122a of the lever unit 138 are fitted to the openings 137 of the slider unit 136 so that the lever unit 138 is fixed to the slider unit 136, and the lever unit 138 is arranged on the contact mold portion 132 (indicated by the arrow C in FIG. 27). FIG. 33 shows the condition of the connector 130 after this assembly process is performed.

Finally, the projections 112 of the contact mold portion 134 are press fitted to the cut-out portions 126a of the shell unit 140, and the shell unit 140 is fixed to the contact mold portion 134. Moreover, the shell unit 140 is arranged on the lever unit 138, and the connector 130 is provided as the final product (indicated by the arrow D in FIG. 27).

By carrying out the above assembly processes, the components are assembled together so that the connector 130 of the present embodiment is provided as the final product.

Figure 34:
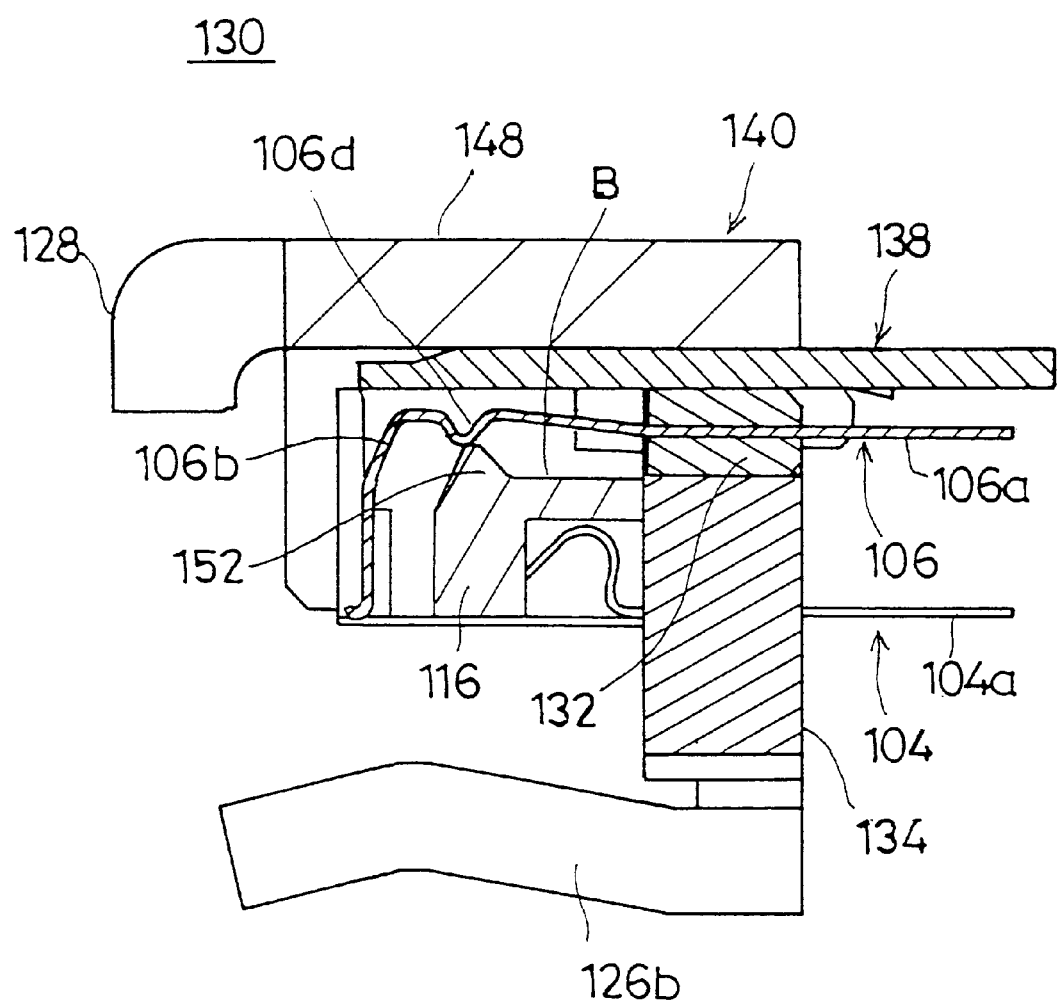
FIG. 34 is a cross-sectional view of the connector of the present embodiment before connection of, the connector and the glass substrate is complete, which is taken along the line XXXIV—XXXIV in FIG. 26.
Figure 35:
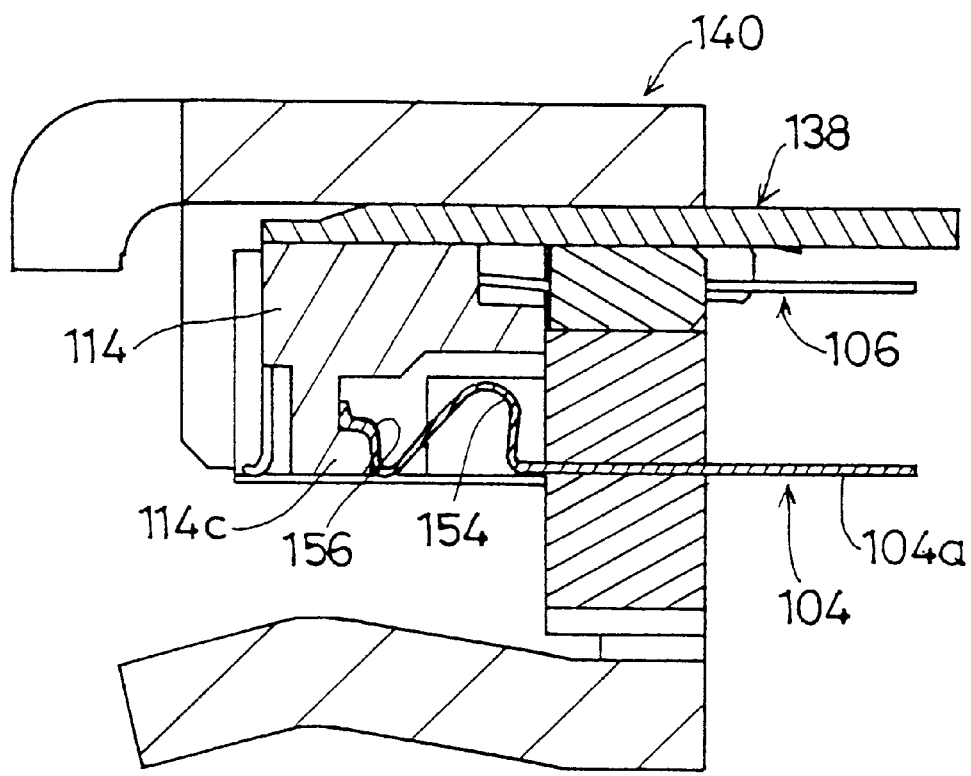
FIG. 35 is a cross-sectional view of the connector of the present embodiment before connection of the connector and the glass substrate is complete, which is taken along the line XXXV—XXXV in FIG. 26.

FIG. 34 is a cross-sectional view of the connector 130 of the present embodiment after assembly and before the connection of the connector 130 and the glass substrate 12b is complete, which is taken along the line XXXIV—XXXIV in FIG. 26. FIG. 35 is a cross-sectional view of the connector 130 of the present embodiment after assembly and before the connection of the connector 130 and the glass substrate 12b is complete, which is taken along the line XXXV—XXXV in FIG. 26.

As shown in FIG. 34 and FIG. 35, the lever unit 138 includes no vertical wall (which is similar to the vertical wall 120 of the lever unit 100 in the connector 90 of the previous embodiment) in the vicinity of the positions where the first contact portions 104a and 106a of the contacts 104 and 106 are connected, by using a wiring cable (not shown), to a printed circuit board (not shown) on which a display drive circuit (LSI) for controlling the plasma display 12 is provided. Hence, when the connector 130 is connected to the printed circuit board using the wiring cable, the connector 130 of the present embodiment is effective in avoiding the interference of the lever unit 138 and the wiring cable, which facilitates the connecting operations using the wiring cable to connect the connector 130 to the printed circuit board.

In the present embodiment, when the slider unit 136 is moved relative to the contact mold portion 134 by using the lever unit 138, a jig (not shown) is passed through the cut-out portion 150 of the shell unit 140 and connected to the cut-out portions 146 of the lever unit 138. By using the jig, the lever unit 138 is moved so that the slider unit 136 is moved through the connection of the slider unit 136 and the lever unit 138.

In the above-described embodiment, the connector 130 is configured such that the contacts 104 and 106 are separated from the electrodes of the substrate 12b before the slider unit 136 is moved relative to the contact mold portion 134. No substantial frictional force is required when the substrate 12b is inserted to or removed from the connector 130, which prevents the damaging of the substrate electrodes 16a or the connector contacts 104 and 106. Further, the connector 130 is configured such that the contacts 104 and 106 are resiliently connected to the electrodes 16a after the slider unit 136 is moved relative to the contact mold portion 134. The connector 130 can be easily connected to the substrate 12b by a one-touch operation, and can maintain the contact condition of the contacts 104 and 106 and the electrodes 16a with adequate stability because of the spring force of the contacts 104 and 106. The deformation or damaging of the contacts 104 and 106 over an extended period of time as in the conventional connector is remarkably reduced.

Further, in the connector 130 of the above-described embodiment, the contacts 104 and the, contacts 106 are arrayed in a staggered arrangement, and the slider unit 136 includes the large-width portions 114 and the small-width portions 116 that are respectively connected to the contacts 104 and the contacts 106. Before the slider unit 136 is moved relative to the contact mold portion 134, the downward projecting portions 106d of the contacts 106 are fitted onto the projections 152 of the small-width portions 116 of the slider unit 136 as shown in FIG. 34. After the slider unit 136 is moved relative to the contact mold portion 134, the downward projecting portions 106d of the contacts 106 are displaced from the projections 152 and placed onto the flat surfaces (indicated by B in FIG. 34) of the small-width portions 116 of the slider unit 136.

In the present embodiment, the lugs 32a of the slider unit 22 of the connector 10 in the previous embodiment are not used. It is possible for the connector 130 of the present embodiment to reduce the length of the slider unit 136 in the longitudinal direction and provide a small-size connector.

Further, as shown in FIG. 35, the contacts 104 in the connector 130 of the present embodiment are different from those of the connector 90 of the previous embodiment, and each of the second contact portions of the contacts 104 includes an inverted-U-shaped part 154 in the middle and a step-like end 156 at the leading edge. In accordance with the configuration of the contacts 104, each of the large-width portions 114 of the slider unit 136 includes a step-like lug 114c. Before the slider unit 136 is moved relative to the contact mold portion 134, the step-like ends 156 of the second contact portions of the contacts 104 are fitted to the lugs 114c of the large-width portions 114 of the slider unit 136.

Similar to the connector 90 of the previous embodiment, the connector 130 of the present embodiment is configured such that the contacts 104 and 106 are separated from the electrodes 16a of the substrate 12b before the slider unit 136 is moved relative to the contact mold portion 134. No substantial frictional force is required when the substrate 12b is inserted to or removed from the connector 130, which prevents the damaging of the substrate electrodes 16a or the connector contacts 104 and 106. Further, the connector 130 is configured such that the contacts 104 and 106 are resiliently connected to the electrodes 16a after the slider unit 136 is moved relative to the contact mold portion 134. The connector 130 can be easily connected to the substrate 12b by a one-touch operation, and can maintain the contact condition of the contacts 104 and 106 and the electrodes 16a with adequate stability because of the spring force of the contacts. The deformation or damaging of the contacts 104 and 106 over an extended period of time as in the conventional connector is remarkably reduced.

Figure 36:
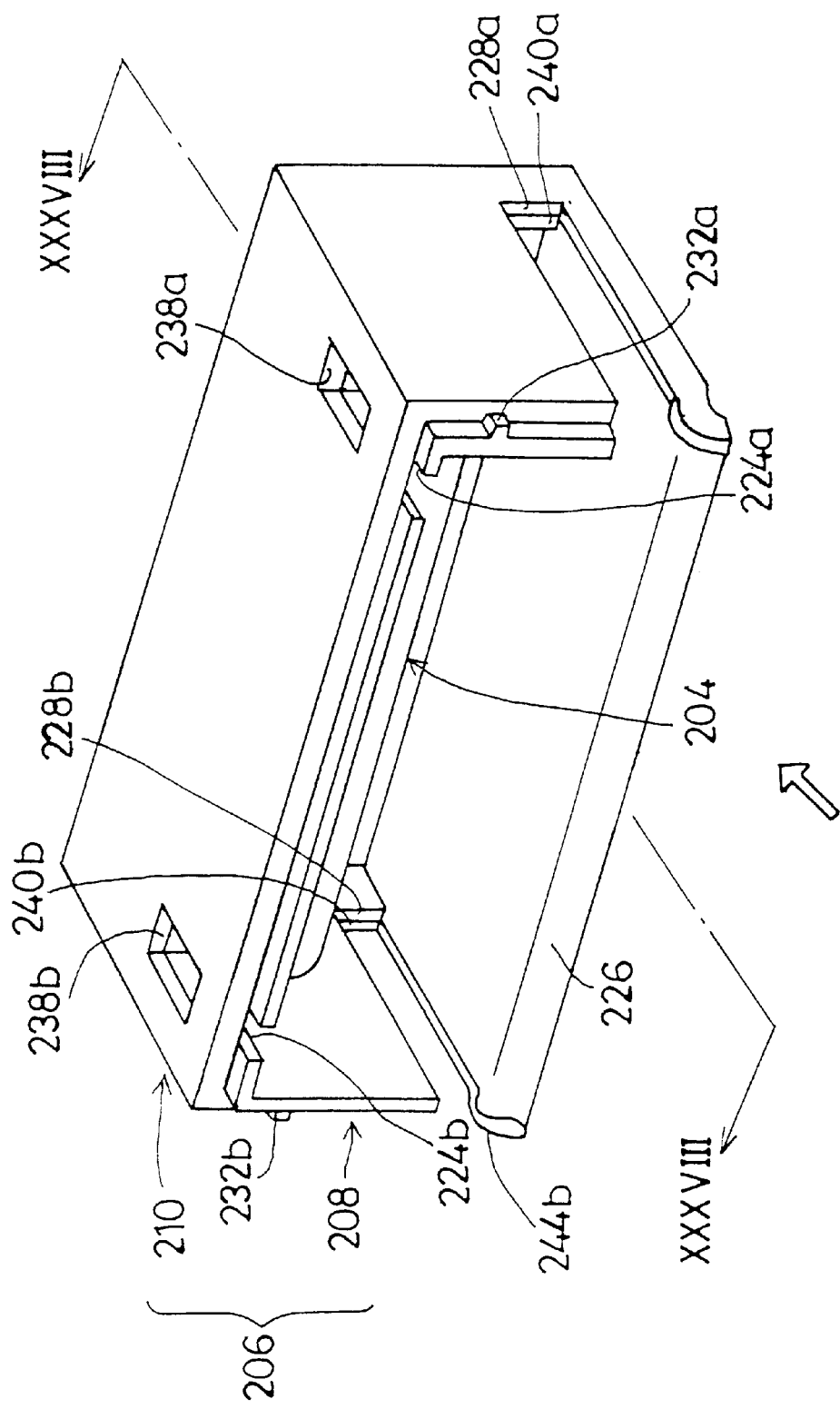
FIG. 36 is a perspective view of a fifth preferred embodiment of the connector of the present invention.
Figure 37:
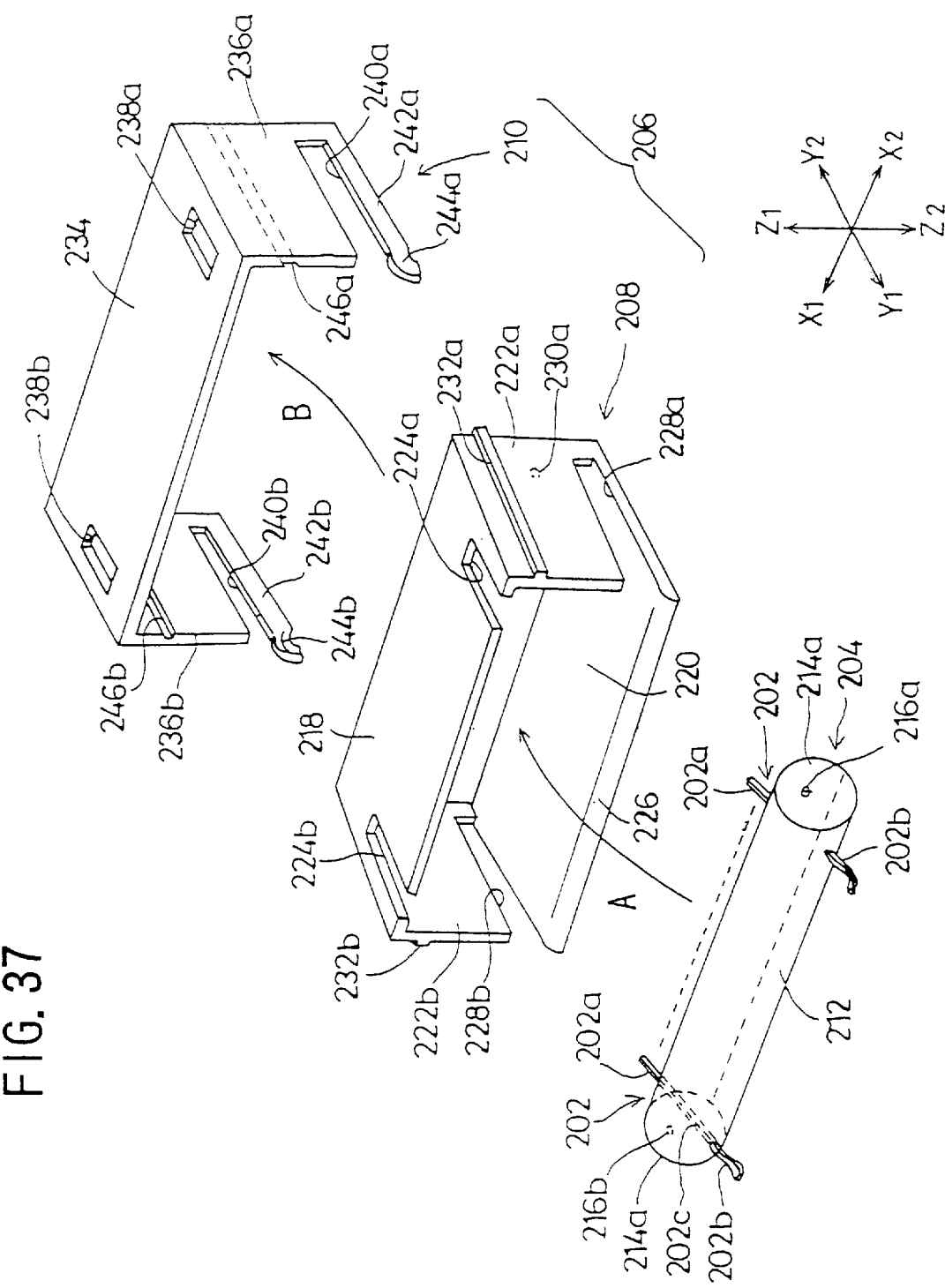
FIG. 37 is an exploded view of the connector of the present embodiment.

Next, FIG. 36 shows a connector 200 as a fifth preferred embodiment of the present invention. FIG. 37 is an exploded view of the connector 200 of the present embodiment.

Similar to the connector 10 of the first preferred embodiment, the connector 200 of the present embodiment is a connector connected to the glass substrate 12b of the plasma display 12.

However, the structure of the connector 200 that achieves the zero insertion force is different from the structure of the connector 10, which will be described later. Moreover, the structure of the glass substrate 12b connected with the connector 200 is different from the structure of the glass substrate 12b that is described above with the connector 10. In the present embodiment, the electrodes 16a are arrayed in one row on the glass substrate 12b, not in a staggered arrangement of the previous embodiment. In the connector 200 of the present embodiment, a plurality of contacts 202 are arrayed in one row so as to conform to the structure of the glass substrate 12b. In FIG. 36, the hollow array indicates the direction of insertion of the glass substrate 12b to the connector 200.

As shown in FIG. 36 and FIG. 37, the connector 200 generally includes a contact unit 204 containing the plurality of contacts 202 arrayed therein, and a housing 206 containing the contact unit 204 and being provided such that the glass substrate 12b carrying the electrodes 16a can be inserted to or removed from the housing 206. The housing 206 includes a contact mounting unit 208 and a shell unit 210, the contact mounting unit 208 containing the contact unit 204, and the shell unit 210 accommodating the contact mounting unit 208.

In the present embodiment, the contacts 202 are formed by using a conductive material. The contact unit 204, the contact mounting unit 208 and the shell unit 210 are formed by using an insulating resin material.

Figure 38:
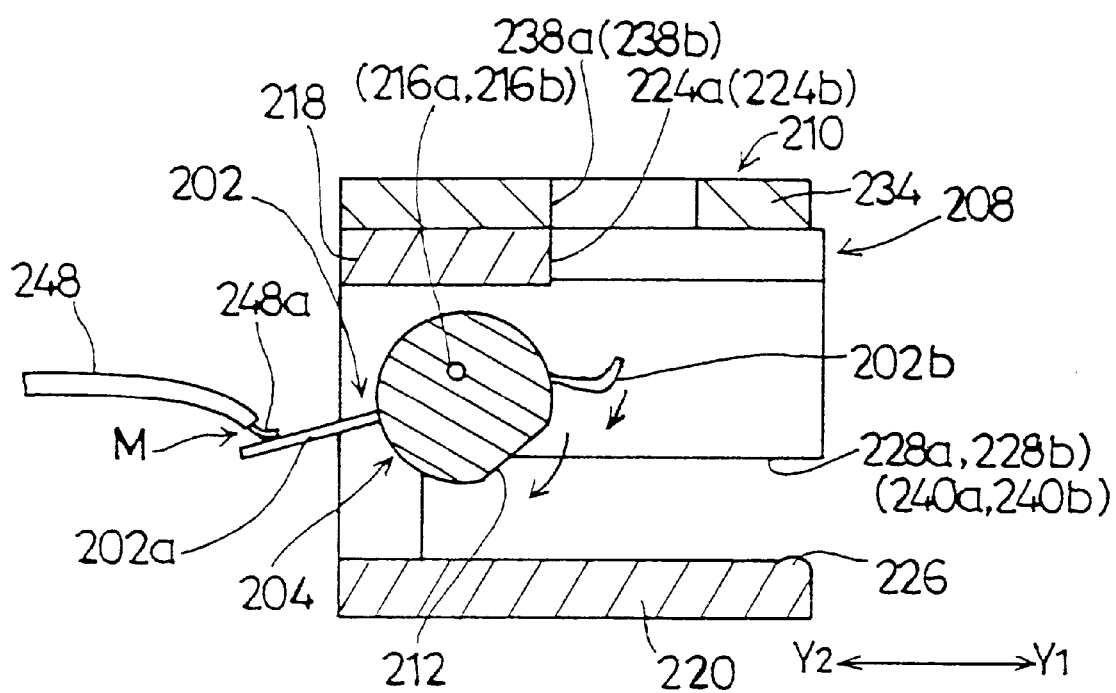
FIG. 38 is a cross-sectional view of the connector of the present embodiment before connection of the connector and the glass substrate is complete, which is taken along the line XXXVIII—XXXVIII in FIG. 36.

In the connector 200 of the present embodiment, each of the contacts 202 includes a straight-line first contact portion 202a at one end of the contact, a V-shaped second contact portion 202b at the other end of the contact, and a connecting portion 202c in the middle of the contact. The first contact) portions 202a of the contacts 202 are respectively connected to core wires 248a of a cable 248 (which is shown in FIG. 38 and will be described later). The second contact portions 202b are connected to the electrodes 16a of the glass substrate 12b. The connecting portions 202c interconnect the first contact portions 202a and the second contact portions 202b respectively.

In the connector 200 of the present embodiment, the contact unit 204 is formed into a generally cylindrical component. The bottom of the contact unit 204 is cut away to form a rectangular flat surface 212, and the flat surface 212 is extending in the longitudinal direction X1-X2 in FIG. 37. Side surfaces 214a and 214b at the ends of the contact unit 204 in the longitudinal direction X1-X2 are provided with projections 216a and 216b, respectively, and the projections 216a and 216b are extending in the longitudinal direction X1-X2. The projections 216a and 216b are provided on the side surfaces 214a and 214b at positions that are deviated upward (in the direction Z1) from the center of gravity of each side surface. Hereinafter, because of this configuration, the projections 216a and 216b will be called the off-center rotational axis of the contact unit 204.

The contacts 202 and the contact unit 204 are integrally formed by performing an insert molding process, such that the contacts 202 pass through the central axis of the contact unit 204 in a transverse direction (in the direction Y1-Y2) perpendicular to the axial direction of the contact unit 204. As described above, the contacts 202 are arrayed in one row on the contact unit 204.

In the connector 200 of the present embodiment, the contact mounting unit 208 generally includes an upper surface 218, a lower surface 220, a side surface 222a, and a side surface 222b. The upper surface 218 and the lower surface 220 are mutually opposed. The side surface 222a and the side surface 222b are mutually opposed. The upper surface 218 includes cut-out portions 224a and 224b which are provided at the front side of the upper surface 218 and in the vicinity of the side surfaces 222a and 222b. The lower surface 220 includes a projecting portion 226 which is provided at the front side of the lower surface 220 and extending in the longitudinal direction X1-X2. The projecting portion 226 is provided with a rounded surface that confronts the up direction Z1.

The side surfaces 222a and 222b are formed in an L-shaped arrangement, and respectively include rectangular cut-out portions 228a and 228b at the bottom positions thereof. The cut-out portions 228a and 228b are adjacent to the lower surface 220, and open to the front side of the lower surface 220. Further, the side surfaces 222a and 222b respectively include holes 230a and 230b at internal positions thereof, and the holes 230a and 230b confront each other. Further, the side surfaces 222a and 222b respectively include outside projecting portions 232a and 232b on the outside upper positions of the side surfaces, and the outside projecting portions 232a and 232b are extending in the direction Y1-Y2.

In the connector 200 of the present embodiment, the shell unit 210 generally includes an upper surface 234, a side surface 236a, and a side surface 236b. The side surface 236a and the side surface 236b are mutually opposed. The upper surface 234 includes rectangular openings 238a and 238b in the vicinity of the side surfaces 236a and 236b. The side surfaces 236a and 236b respectively include rectangular cut-out portions 240a and 240b at lower positions of the side surfaces. The cut-out portions 240a and 240b are open to the front-side ends of the side surfaces. The side surfaces 236a and 236b respectively include leg portions 242a and 242b at the bottom of the side surfaces and beneath the cut-out portions 240a and 240b. The leg portions 242a and 242b respectively include projections 244a and 244b at the front-side ends of the leg portions. The projections 244a and 244b are provided with rounded surfaces that confront the up direction Z1. Further, the side surfaces 236a and 236b respectively include inside recessed portions 246a and 246b on the inside upper positions of the side surfaces, and the inside recessed portions 246a and 246b are extending in the direction Y1-Y2.

When assembling the above-described components into the connector 200 of the present embodiment, the following assembly processes are performed.

First, the contact unit 204 containing the contacts 202 arrayed therein is placed with the side of the flat surface 212 down. While the contact unit 204 is slightly curved in the longitudinal direction X1-X2, the projections 216a and 216b of the contact unit 204 are fitted into the holes 230a and 230b of the contact mounting unit 208. By this connection, the contact unit 204 is rotatably attached to the contact mounting unit 208 (indicated by the arrow A in FIG. 37). The contact unit 204 is rotatable around the off-center rotational axis (the projections 216a and 216b), and the first contact portions 202a and the second contact portions 202b of the contact 202 are movable relative to the contact mounting unit 208 in accordance with the rotation of the contact portion 204. In this condition, as shown in FIG. 37, the first contact portions 202a of of the contacts 202 are set at the rear-side opening (the direction Y2) of the contact mounting unit 208, and the second contact portions 202b of the contacts 202 are set at the front-side opening (the direction Y1) of the contact mounting, unit 208.

Second, the projecting portions 232a and 232b of the contact mounting unit 208 are fitted to the recessed portions 246a and 246b of the shell unit 210, and the contact mounting unit 208 is attached to the shell unit 210 (indicated by the arrow B in FIG. 37). The connector 200 of the present embodiment is provided as the final product. In this condition, the contact mounting unit 208 is attached to the shell unit 210 such that the upper surface 218 and the side surfaces 222a and 222b slightly project from the shell unit 210. The cut-out portions 228a and 228b of the contact mounting unit 208 match with the cut-out portions 240a and 240b of the shell unit 210. Further, the projecting portion 226 of the contact mounting unit 208 matches with the projections 244a and 244b of the shell unit 210, so that the top surface of the projecting portion 226 is flush with the top surfaces of the projections 244a and 244b.

A description will now be given of the connection structure of the connector 200 of the present embodiment and the glass substrate 12b with reference to FIG. 38 and FIG. 39.

FIG. 38 is a cross-sectional view of the connector 200 of the present embodiment before the connection of the connector 200 and the glass substrate 12b is complete, which is taken along the line XXXVIII—XXXVIII in FIG. 36.

As shown in FIG. 38, one of the core wires 248a of the cable 248 is soldered to the first contact portion 202a of one of the contacts 202 as indicated by the arrow M in FIG. 38. As the cable 248 is made of the flexible material, the soldered positions of the cable 248 are movable in accordance with the movement of the contacts 202.

Before the connection of the connector 200 and the glass substrate 12b is complete, the contact unit 204 is set in the condition wherein the flat surface 212 of the contact unit 204 is slanted relative to the horizontal direction Y1-Y2. Hence, the first contact portions 202a of the contacts 202 are lowered while the second contact portions 202b of the contacts 202 are raised upward from the cut-out portions 228a and 228b (or 240a and 240b). The leading edge of the cable 248 is slightly curved downward.

When the glass substrate 12b is inserted into the connector 200 which is set in the condition shown in FIG. 38, the leading edge of the substrate 12b enters the cut-out portions 228a and 228b (or 240a and 240b) while the insertion of the substrate 12b is guided by the projecting portion 226 and the projections 244a and 244b. At this time, the electrodes 16a on the top surface of the substrate 12b are not in contact with the contacts 202 because the second contact portions 202b of the contacts 202 are raised upward from the cut-out portions 228a and 228b (or 240a and 240b). During the insertion, the bottom surface of the substrate 12b smoothly slides on the flat lower surface 220 of the contact mounting unit 208.

Immediately before the leading edge of the glass substrate 12b reaches the flat surface 212 of the contact unit 204, the position matching of the contacts 202 and the electrodes 16a is performed while viewing the second contact portions 202b of the contacts 202 from the openings 238a and 238b and the cut-out portions 224a and 224b. A further movement of the glass substrate 12b in the direction of the insertion causes the glass substrate 12b to push the flat surface 212 of the contact unit 204. Hence, the contact unit 204 is rotated clockwise around the projections 216a and 216b by the glass substrate 12b. After the connection of the connector 200 and the glass substrate 12b is complete, the connecter 200 is set in the condition shown in FIG. 39, and the glass substrate 12b is brought into contact with the flat surface 212 of the contact unit 204.

Figure 39:
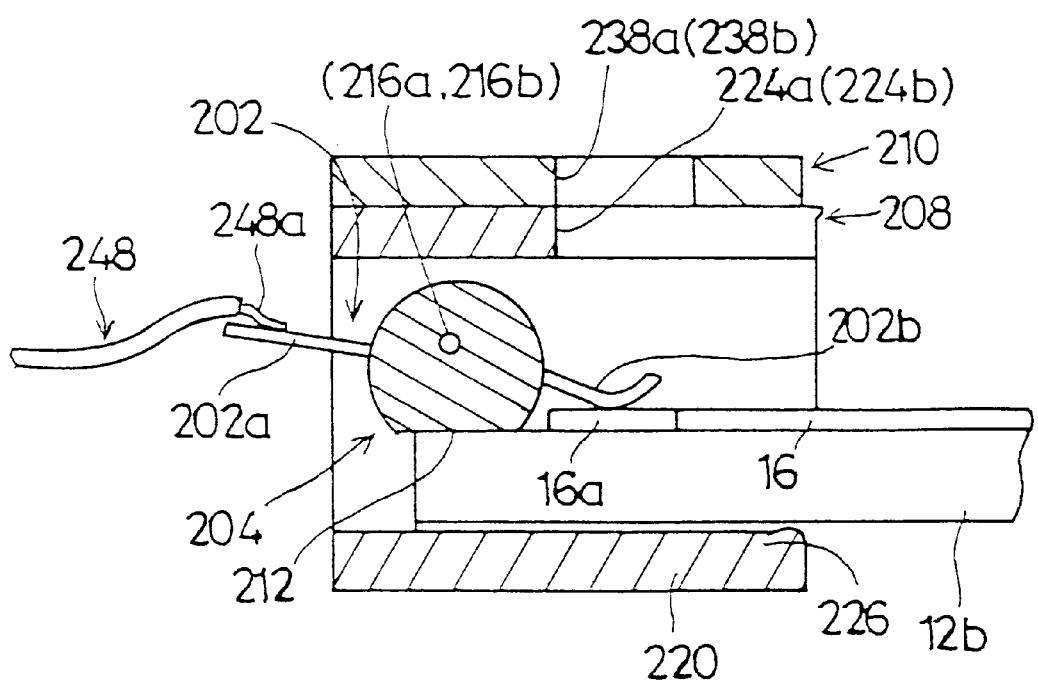
FIG. 39 is a cross-sectional view of the connector of the present embodiment after the connection of the connector and the glass substrate is complete.

FIG. 39 is a cross-sectional view of the connector 200 of the present embodiment after the connection of the connector 200 and the glass substrate 12b is complete. For the sake of convenience of illustration, the cross-section of the glass plate 12b is indicated as the hollow region, and the hatching lines of the glass plate 12b are omitted.

As shown in FIG. 39, after the glass substrate 12b is completely connected to the connector 200, the flat surface 212 of the contact unit 204 is set in the horizontal position, and the inserted glass substrate 12b is in surface contact with the flat surface 212. In this condition, the rotation of the contact unit 204 relative to the contact mounting unit 208 is stopped. The glass substrate 12b is firmly held between the contact unit 204 and the lower surface 220 of the contact mounting unit 208. Hence, by this connection, the separation of the connector 200 from the glass substrate 12b is avoided even when an undesired force is exerted to the connector 200.

After the contact unit 204 is rotated clockwise by the glass substrate 12b, the second contact portions 202b of the contacts 202 are resiliently connected to the electrodes 16a of the glass substrate 12b. The contacts 202 at this time are firmly and stably connected to the electrodes 16a because of the spring force of the contacts 202. Consequently, the electrical connection between the connector 200 (the contacts 202) and the glass substrate 12b (the electrodes 16a) is established. At this time, the first contact portions 202a of the contacts 202 are set in the horizontal position, and the leading edge of the cable 248 is slightly raised upward to follow the movement of the first contact portions 202a.

In the present embodiment, when disconnecting the connector 200 from the glass substrate 12b in the condition shown in FIG. 39, the contact unit 204 is rotated counterclockwise around the projections 216a and 216b to the initial position shown in FIG. 38. By this rotation of the contact unit 204, the glass substrate 12b is easily moved in the opposition direction Y1. When the connector 200 is set in the condition shown in FIG. 38, the connector 200 can be easily removed from the substrate 12b. No substantial frictional force is exerted on the contacts 202 or the electrodes 16a when the connector 200 is disconnected from the substrate 12b.

Similar to the connector 10 of the previous embodiment, the connector 200 of the present embodiment is configured such that the contacts 202 are separated from the electrodes 16a of the substrate 12b before the contact unit 204 is rotated relative to the contact mounting unit 208. No substantial frictional force is required when the substrate 12b is inserted to or removed from the connector 200, which prevents the damaging of the substrate electrodes 16a or the connector contacts 202. Further, the connector 200 is configured such that the contacts 202 are resiliently connected to the electrodes 16a after the contact unit 204 is rotated relative to the contact mounting unit 208. The connector 200 can be easily connected to the substrate 12b by a one-touch operation, and can maintain the contact condition of the contacts 202 and the electrodes 16a with adequate stability because of the spring force of the contacts 202. The deformation or damaging of the contacts 202 over an extended period of time as in the conventional connector is remarkably reduced.

Next, a description will be given of an alternative embodiment of the connecting structure of the connector 200 of the fifth preferred embodiment and the cable 248 with reference to FIG. 40 through FIG. 42.

Figure 40:
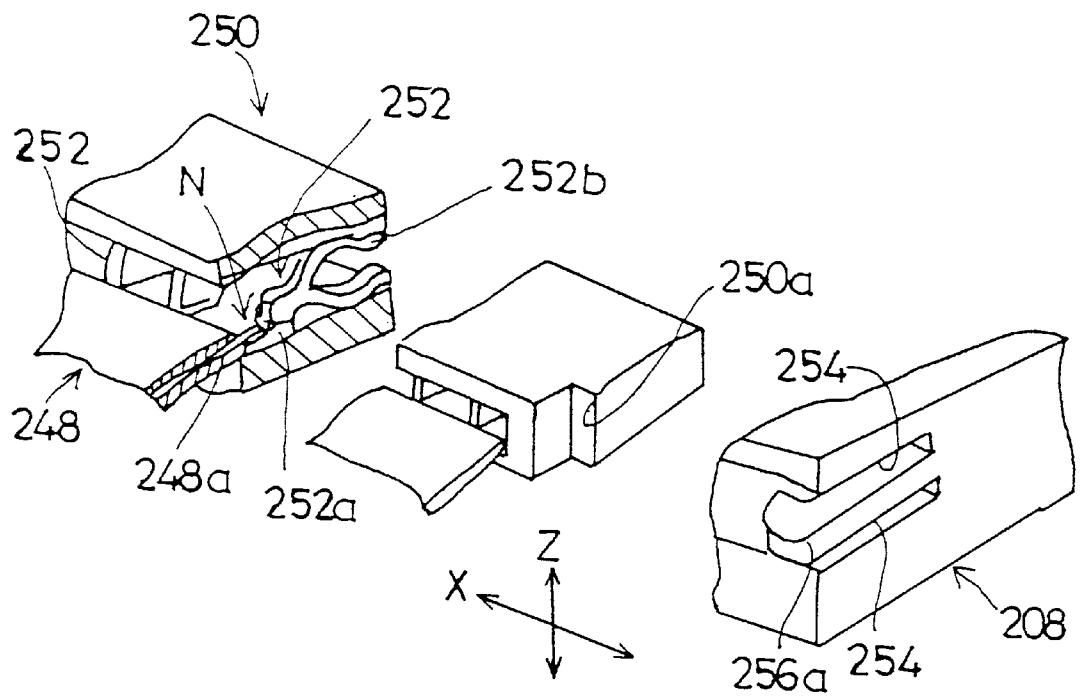
FIG. 40 is an exploded view of an alternative embodiment of the connecting structure of the connector of the fifth preferred embodiment and the cable.

FIG. 40 is a partially cut-out, exploded view of the contact mounting unit 208, a connector portion 250 and the cable 248 in the alternative embodiment of the connector 200. FIG. 41 is a cross-sectional view of the connector 200 of the present embodiment before the connection of the connector 200 and the glass substrate 12b is complete. FIG. 42 is a cross-sectional view of the connector 200 of the present embodiment after the connection of the connector 200 and the glass substrate 12b is complete.

As shown in FIG. 40, the connector 200 of the present embodiment includes a connector portion 250 that is connected to the cable 248. The connector portion 250 includes a plurality of terminals 252 that are arrayed therein. A pair of cut-out corners 250a are provided at the ends of the connector portion 250 in the direction X in FIG. 40. Each of the terminals 252 includes an L-shaped contact portion 252a at one end and a bifurcated contact portion 252b at the other end. The L-shaped contact portion 252a of each terminal 252 is connected to the core wire 248a of the cable 248. The bifurcated contact portion 252b of each terminal 252 is connected to the first contact portion 202a of one of the contacts 202. The two separate ends of the bifurcated contact portions 252b of the terminals 252 are provided to be flexible and movable in the vertical direction Z in FIG. 40.

The cable 248 includes the core wires 248a which are soldered to the straight parts of the contact portions 252a of the terminals 252 as indicated by "N" in FIG. 40. Hence, the cable 248 and the connector portion 250 are integrally formed.

In the connector 200 of the present embodiment, the contact mounting unit 208 includes two slits 254 at the corners of the contact mounting unit 208 in the direction X. As shown in FIG. 40, a projection 256a is provided between the two slits 254 at one of the corners of the contact mounting unit 208. The projections 256a at the corners of the contact mounting unit 208 are provided to be flexible and movable in the vertical direction Z in the FIG. 40.

Figure 41:
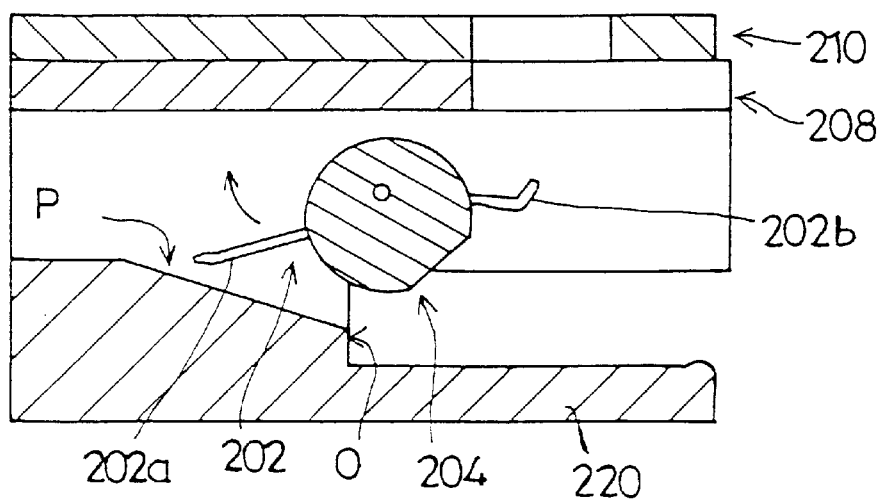
FIG. 41 is a cross-sectional view of the connector of the present embodiment before the connection of the connector and the glass substrate is complete.

Before the connection of the connector 200 and the glass substrate 12b is complete, the connector portion 250 to which the cable 248 is connected by soldering is not connected to the connector 200 as shown in FIG. 41. This configuration of the connector portion 250 allows a plurality of the connectors 200 (which are similar to the connectors 10 shown in FIG. 3) to be easily connected to the glass substrate 12b of the plasma display 12.

Figure 42:
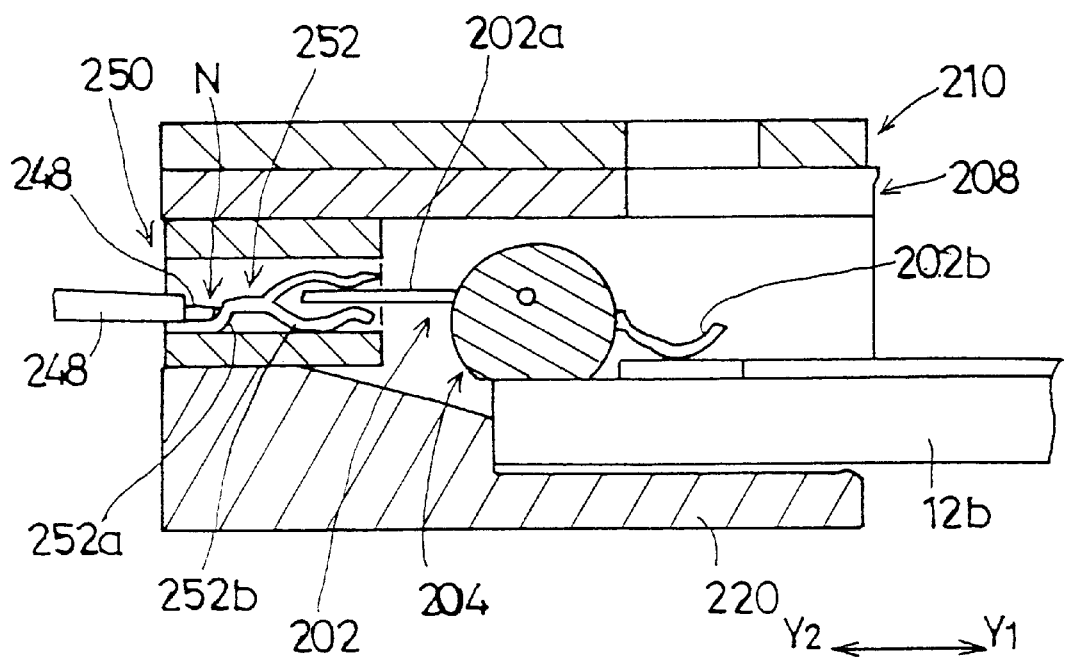
FIG. 42 is a cross-sectional view of the connector of the present embodiment after the connection of the connector and the glass substrate is complete.

After the connection of the connector 200 and the glass substrate 12b is complete, the first contact portions 202a of the contacts 202 are set in the horizontal position (which is parallel to the direction Y2) as shown in FIG. 42.

As shown in FIG. 42, the connector portion 250 is inserted into the left-side opening of the contact mounting unit 208, and the first contact portions 202a of the contacts 202 are held between the bifurcated contact portions 252b of the terminals 252 so that the connector portion 250 is connected to the connector 200. At this time, the connector portion 250 is placed into the contact mounting unit 208 by fitting the cut-out corners 250a of the connector portion 250 to the projections 256a of the contact mounting unit 208. By the connection of the cut-out corners 250a and the projections 256a, the separation of the connector portion 250 from the contact mounting unit 208 is avoided even when an undesired force is exerted to the connector 200.

In the connector 200 of the present embodiment, the lower surface 220 of the contact mounting unit 208 is provided with a step-like portion and a slanted portion. When the glass substrate 12b is inserted to the connector 200, the substrate 12b is brought into contact with the step-like portion of the lower surface 220, and the movement of the substrate 12b is safely stopped at the step-like portion. Further, the connector 200 of the present embodiment is configured such that, when the contact unit 204 is rotated, the first contact portions 202a of the contacts 202 do not interfere with the lower surface 220 of the contact mounting unit 208.

The present invention is not limited to the above-described embodiments, and variations and modifications may be made without departing from the scope of the present invention.

Further, the present invention is based on Japanese priority application No. 2000-276402, filed on Sep. 12, 2000, Japanese priority application No. 2000-356046, filed on Nov. 22, 2000, and Japanese priority application No. 2000-375180, filed on Dec. 8, 2000, the entire contents of which are hereby incorporated by reference.

What is claimed is:

1. A connector electrically connected to a substrate having a surface, a conductor pattern on the surface, and electrodes at ends of the conductor pattern, the connector comprising:
- a plurality of contacts resiliently connected to the electrodes of the substrate;
- an insulator member to contain the plurality of contacts, the insulator member comprising:
  - a plurality of side surfaces, and
  - a cam groove at each of the side surfaces,
  - the cam grooves including low-level steps and. high-level steps, the substrate being inserted to or removed from the insulator member;
- a slider unit movably attached to the insulator member, the slider unit comprising a plurality of projections said projections are connected and recesses, to the contacts and being fitted to the cam grooves;
- wherein in a first state the projections are connected to the low-level steps to separate the contacts from the electrodes, and in a second state the projections are connected to the high-level steps so that the contacts are resiliently connected to the electrodes by the connection between the projections and the contacts; and
- a fixing unit to secure the insulator member to the slider unit to firmly connects the contacts to the electrodes, the fixing unit including:
  - a bottom portion, and
  - a plurality of lugs at the bottom portion of the fixing unit, the lugs to fit the recesses of the slider unit in the second state.

2. The connector according to claim 1, wherein the insulator member includes a longitudinal line, the contacts are arrayed in a staggered arrangement in the insulator member, and the contacts comprise first contacts and second contacts alternately arrayed along the longitudinal line of the insulator member.

3. The connecter according to claim 1, wherein the substrate is a glass substrate of a plasma display panel.

* * * * *

UNITED STATES PATENT AND TRADEMARK OFFICE
CERTIFICATE OF CORRECTION

PATENT NO.    : 6,508,657 B2
DATED         : January 21, 2003
INVENTOR(S)   : Yutaka Fukumoto et al.

It is certified that error appears in the above-identified patent and that said Letters Patent is hereby corrected as shown below:

<u>Column 29,</u>
Line 11, delete ".".
Line 15, after "projections" insert -- and recesses, --.
Line 16, delete "and recesses,".

Signed and Sealed this

Third Day of June, 2003

JAMES E. ROGAN
*Director of the United States Patent and Trademark Office*